(12) United States Patent
Reponen et al.

(10) Patent No.: US 8,812,990 B2
(45) Date of Patent: Aug. 19, 2014

(54) METHOD AND APPARATUS FOR PRESENTING A FIRST PERSON WORLD VIEW OF CONTENT

(75) Inventors: Erika Piia Pauliina Reponen, Tampere (FI); Jaakko Olli Taavetti Keranen, Tampere (FI); Aarne Vesa Pekka Ketola, Tampere (FI); Panu Marten Jesper Johansson, Shenzhen (CN); Jari Tapio Selenius, Nurmijärvi (FI); Lotta Maaria Partanen, Helsinki (FI)

(73) Assignee: Nokia Corporation, Espoo (FI)

( * ) Notice: Subject to any disclaimer, the term of this patent is extended or adjusted under 35 U.S.C. 154(b) by 505 days.

(21) Appl. No.: 13/162,132

(22) Filed: Jun. 16, 2011

(65) Prior Publication Data
US 2012/0013609 A1    Jan. 19, 2012

Related U.S. Application Data

(63) Continuation-in-part of application No. 12/636,262, filed on Dec. 11, 2009, now Pat. No. 8,543,917.

(51) Int. Cl.
*G06F 3/048* (2013.01)
*G06F 3/0481* (2013.01)

(52) U.S. Cl.
CPC ................................. *G06F 3/04815* (2013.01)
USPC ......................................... 715/848; 715/850

(58) Field of Classification Search
CPC .................................................. G06F 3/04815
USPC .................................. 715/849, 851, 848, 850
See application file for complete search history.

(56) References Cited

U.S. PATENT DOCUMENTS

| | | | |
|---|---|---|---|
| 5,790,121 A | 8/1998 | Sklar et al. | |
| 6,037,936 A | 3/2000 | Ellenby et al. | |
| 6,201,544 B1 | 3/2001 | Ezaki | |
| 6,388,684 B1 | 5/2002 | Iwamura et al. | |
| 6,507,340 B1 * | 1/2003 | Yamaguchi et al. | 345/421 |
| 6,529,900 B1 | 3/2003 | Patterson et al. | |

(Continued)

FOREIGN PATENT DOCUMENTS

EP    1 274 264 A1    1/2003

OTHER PUBLICATIONS

Notification of Transmittal of the International Search Report and the Written Opinion of the International Searching Authority, or the Declaration for Application No. PCT/FI2010/050960, dated May 9, 2011, pp. 1-18.

A. Nurminen, "Mobile Three-Dimensional City Maps," 2009, chapter 5.4, figure 5.5, pp. 1-102, TKK Dissertations in Media Technology.

(Continued)

*Primary Examiner* — William Titcomb
(74) *Attorney, Agent, or Firm* — Ditthavong & Steiner, P.C.

(57) ABSTRACT

An approach is provided for presenting a global view of content. A content mapping platform determines a viewing location of a device with respect to a user interface, wherein the user interface depicts a three-dimensional object in which a surface closest to the viewing location is transparent to show, at least in part, an opposite surface of the three-dimensional object. Further, the content mapping platform then determines at least one target location associated with at least one content item. Furthermore, the content mapping platform causes, at least in part, a rendering of the at least one content item on the opposite surface of the three-dimensional object based, at least in part, on the at least one target location.

20 Claims, 18 Drawing Sheets

(56) References Cited

U.S. PATENT DOCUMENTS

| | | | |
|---|---|---|---|
| 6,990,637 B2 | 1/2006 | Anthony et al. | |
| 7,146,574 B2 | 12/2006 | Goldthwaite et al. | |
| 7,688,346 B2 * | 3/2010 | Richards | 348/36 |
| 8,212,807 B2 * | 7/2012 | Ingersoll et al. | 345/419 |
| 8,243,997 B2 * | 8/2012 | Davis et al. | 382/109 |
| 8,250,052 B2 * | 8/2012 | Barnett | 707/706 |
| 8,250,481 B2 * | 8/2012 | Klaric et al. | 715/765 |
| 8,392,853 B2 * | 3/2013 | Shipley | 715/848 |
| 2003/0184594 A1 | 10/2003 | Ellenby et al. | |
| 2003/0210228 A1 * | 11/2003 | Ebersole et al. | 345/157 |
| 2005/0183038 A1 | 8/2005 | Yamamoto et al. | |
| 2006/0020898 A1 * | 1/2006 | Kim et al. | 715/764 |
| 2007/0027591 A1 | 2/2007 | Goldenberg et al. | |
| 2007/0077463 A1 | 4/2007 | Adams et al. | |
| 2007/0097113 A1 * | 5/2007 | Lee et al. | 345/419 |
| 2007/0273557 A1 * | 11/2007 | Baillot | 340/988 |
| 2008/0069404 A1 | 3/2008 | Lee et al. | |
| 2008/0188210 A1 | 8/2008 | Choi et al. | |
| 2008/0216009 A1 | 9/2008 | Drallos | |
| 2008/0268876 A1 | 10/2008 | Gelfand et al. | |
| 2009/0063983 A1 | 3/2009 | Amidon et al. | |
| 2009/0083670 A1 * | 3/2009 | Roos | 715/850 |
| 2009/0303204 A1 | 12/2009 | Nasiri et al. | |
| 2009/0307611 A1 | 12/2009 | Riley | |
| 2010/0100835 A1 * | 4/2010 | Klaric et al. | 715/765 |
| 2010/0145979 A1 * | 6/2010 | Barnett | 707/769 |
| 2010/0302348 A1 * | 12/2010 | Richards | 348/36 |
| 2011/0016433 A1 * | 1/2011 | Shipley | 715/849 |
| 2013/0007670 A1 * | 1/2013 | Roos | 715/851 |
| 2013/0218688 A1 * | 8/2013 | Roos | 705/14.69 |

OTHER PUBLICATIONS

A. Nurminen, "Mobile 3D City Maps," Jul./Aug. 2008, pp. 20-31, IEEE Computer Graphics and Applications.

K. German, "Nokia's Point & Find gives new life to the camera phone," Apr. 2, 2009, Retrieved from the internet http://reviews.cnet.com/8301-12261_7-10210256-51.html.

Reponen et al., "World-wide access to geospatial data by pointing through the earth," Apr. 14-15, 2010, pp. 3895-3900, CHI 2010: Work-in-Progress (Spotlight on Posters Days 3 & 4).

O. Diaz, "First Person View," Internet Publication, 2009, pp. 1-3, retrieved from the internet, www.phpclasses.org/package/6460-PHP-Browse-images-like-a-first-person-view-game.html.

PHPclasses, "Games," Internet Publication, 2009, pp. 1-4, retrieved from the internet, www.phpclasses.org/browse/class/30.html.

Non Final Rejection received in corresponding U.S. Appl. No. 12/636,262, Dated Jan. 30, 2012, pp. 1-18.

Extended European Search Report for corresponding Patent Application No. 10 83 5546.2 dated Sep. 6, 2013, 7 pages.

Bane, R. et al., "Interactive Tools for Virtual X-Ray Vision in Mobile Augmented Reality." Proceedings of the Third IEEE and ACM International Symposium on Mixed and Augmented Reality (ISMAR 2004), Arlington, VA, U.S.A., Nov. 2-5, 2004, pp. 231-239, XP010769702, DOI: 10.1109/ISMAR.2004.36, ISBN: 978-0-7695-2191-6.

Chinese Office Action for related application No. 201080056025.3, issued Mar. 26, 2014, 9 pages (English Summary of Office Action Included).

* cited by examiner

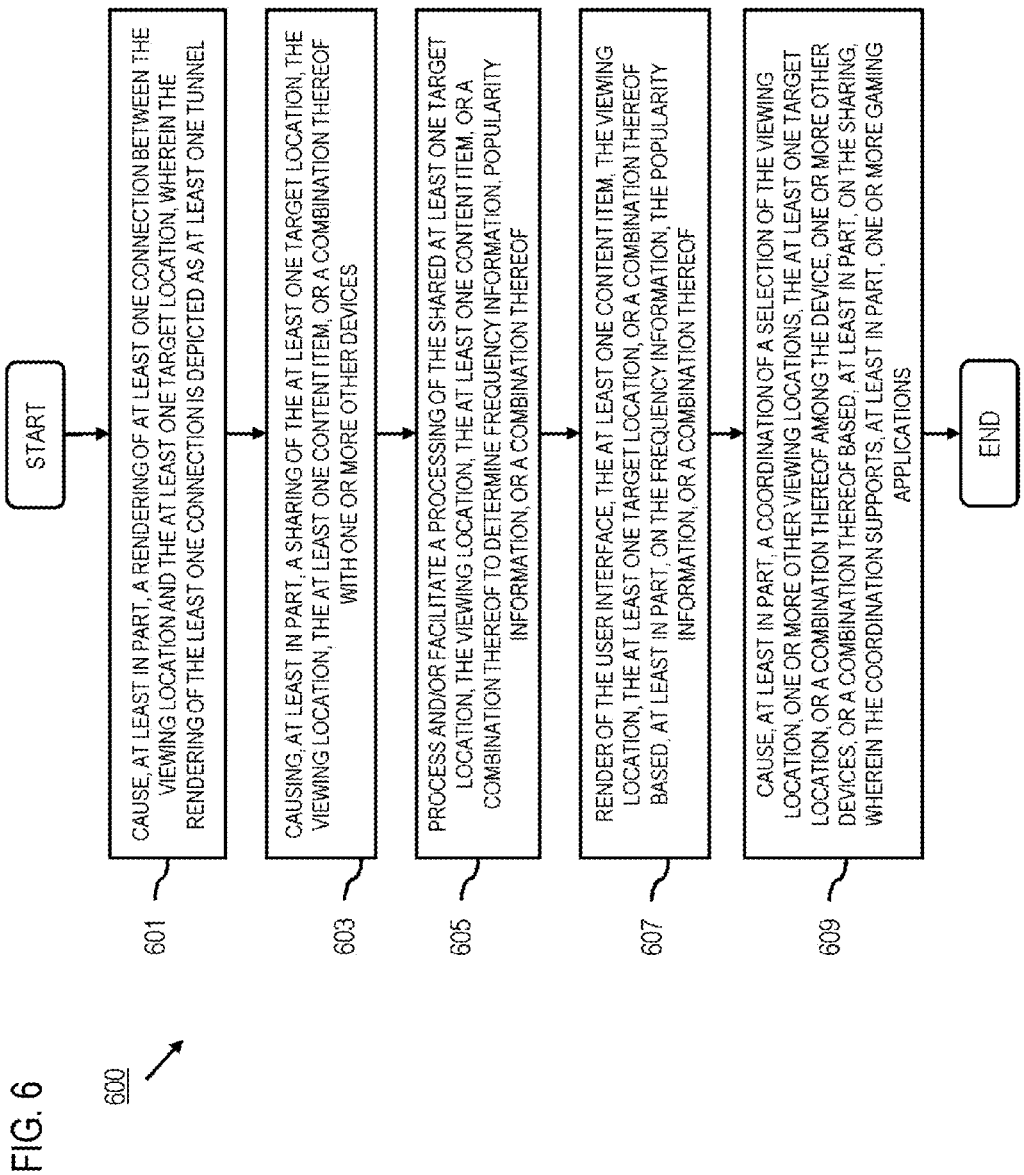

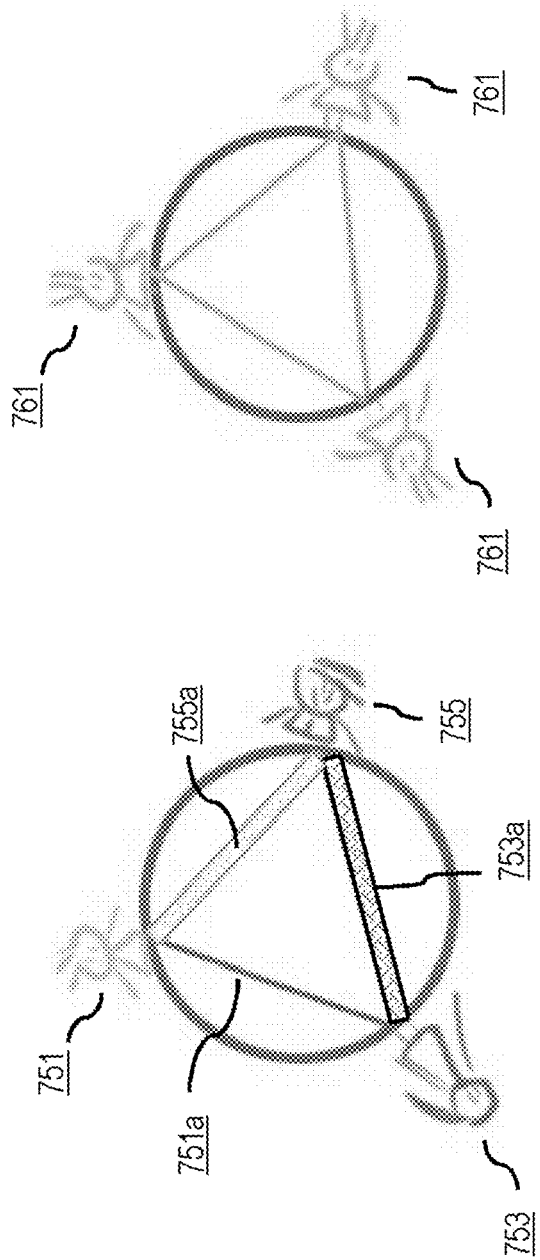

FIG. 10

Add Channels to
local channel guide

Add Channel

You can add a new channel by
clicking the "Add Channel" Button
and pasting the appropriate URL.

| Channel | Description | Views | Added | Rating |
|---|---|---|---|---|
| BTV 98 | Local TV channel from Bonita Springs (Florida). | 1028 | 07/30/09 02:06 PM | ☆☆☆☆☆ |
| KLTV | Local TV channel from Jacksonville (Texax). | 848 | 07/30/09 02:05 PM | ☆☆☆☆☆ |
| KKCO | Local TV channel from Grand Junction (Colorado). | 628 | 07/30/09 02:05 PM | ☆☆☆☆☆ |
| WNEP Scranton | Local TV channel from Scranton (Pennsylvania). | 710 | 07/30/09 02:05 PM | ☆☆☆☆☆ |
| KDVR | Local TV channel from Denver (Colorado). | 834 | 07/30/09 02:05 PM | ☆☆☆☆☆ |
| WGAL | Local TV channel from Lancaster (Pennsylvania). | 787 | 07/30/09 02:05 PM | ☆☆☆☆☆ |
| KPIX CBS 5 | Local TV channel from San Francisco (California). | 2665 | 07/30/09 02:05 PM | ★★★★☆ |
| WJW TV | Local TV channel from Cleveland (Ohio). | 1011 | 07/30/09 02:05 PM | ☆☆☆☆☆ |
| CTV TV30 | Local TV channel from Pleasanton (California). | 785 | 07/30/09 02:05 PM | ☆☆☆☆☆ |
| WXII | Local TV channel from Winston-Salem (North Carolina). | 991 | 07/30/09 02:05 PM | ☆☆☆☆☆ |
| BETV 28 | Local TV channel from Berkeley (California). | 804 | 07/30/09 02:05 PM | ☆☆☆☆☆ |
| KTVI | Local TV channel from St. Louis (Missouri). | 754 | 07/30/09 02:05 PM | ☆☆☆☆☆ |
| WDIV | Local TV channel from Detroit (Michigan). | 756 | 07/30/09 02:05 PM | ☆☆☆☆☆ |
| WH-PR TV 33 | Local TV channel from Detroit (Michigan). | 597 | 07/30/09 02:05 PM | ☆☆☆☆☆ |
| Toronto TV 4 | independent webTV channel. | 1738 | 07/30/09 01:49 PM | ★★☆☆☆ |
| CBC North | English version of recorded daily news. | 899 | 07/30/09 01:49 PM | ☆☆☆☆☆ |
| Karaoke TV | Sing along to all your favourite tunes with this karaoke channel. | 7052 | 07/30/09 12:33 PM | ★★★★☆ |
| Fox Sports Live | NFL, NBA, NHL, MLB, nascar, soccer, golf, tennis and more. | 27751 | 06/23/09 03:11 PM | ★★★★☆ |
| The CW Live | Series such as Gossip Girl, 90210 and Americas Next Topmodel. | 25789 | 06/23/09 03:10 PM | ★★★★☆ |
| For Business Live | News about business, investments, stock market events and data. | 10367 | 06/23/09 03:07 PM | ★★★★☆ |

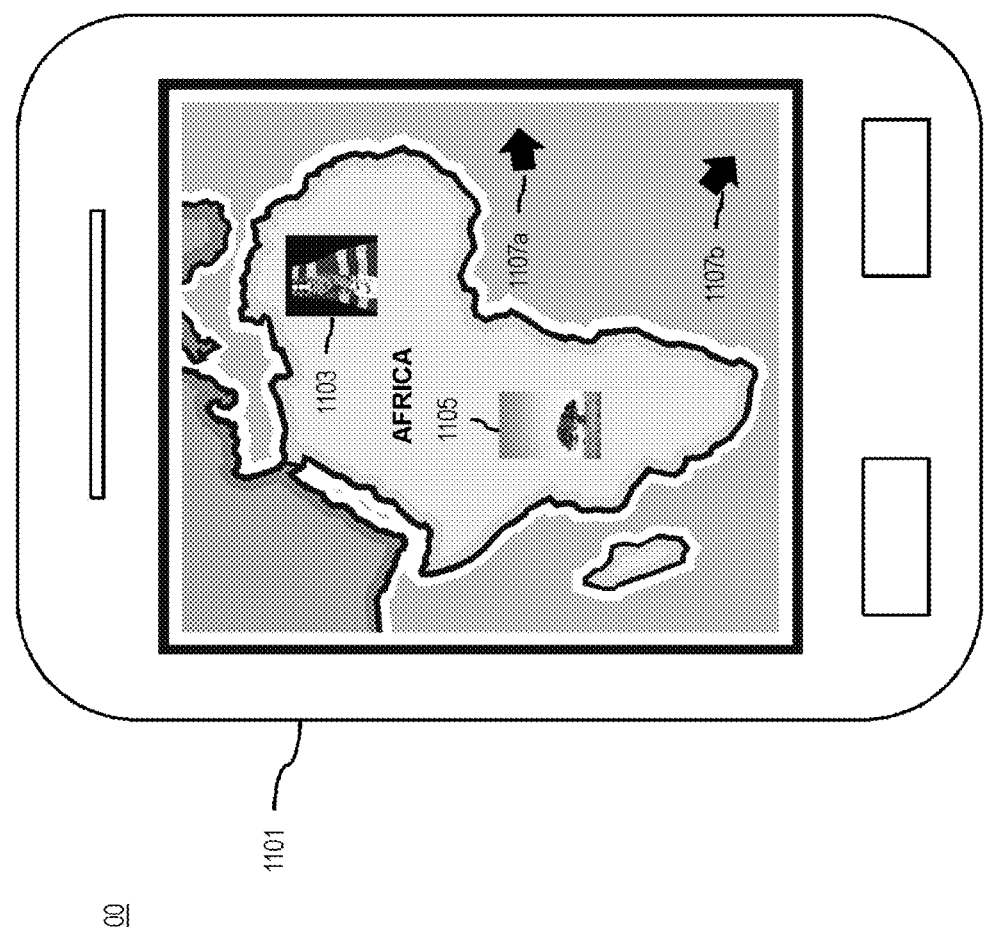

METHOD AND APPARATUS FOR PRESENTING A FIRST PERSON WORLD VIEW OF CONTENT

RELATED APPLICATION

This application is a continuation-in-part of prior application Ser. No. 12/636,262, "METHOD AND APPARATUS FOR PRESENTING A FIRST PERSON WORLD VIEW OF CONTENT," filed Dec. 11, 2009, which is herein incorporated by reference in its entirety.

BACKGROUND

Service providers (e.g., wireless, cellular, etc.) and device manufacturers are continually challenged to deliver value and convenience to consumers by, for example, providing compelling network services. One area of interest has been the development of services for providing online content over, for instance, the Internet (e.g., online television broadcasts, streaming video and audio, photographs, etc.), which in turn has resulted in an abundance of available content originating from across the world. It is noted that much of this content can be of high quality (e.g., professionally produced online web television channels) and attractive to a broad spectrum of users, but this content is often hard to find. Accordingly, service providers and device manufacturers face significant technical challenges to enabling users to discover and access such content.

Some Example Embodiments

Therefore, there is a need for an approach for efficiently discovering the availability of content and then presenting a first person world view of the discovered content. According to one embodiment, a method comprises determining a viewing location of a device with respect to a user interface, wherein the user interface depicts a three-dimensional object in which a surface closest to the viewing location is transparent to show, at least in part, an opposite surface of the three-dimensional object. The method also comprises determining at least one target location associated with at least one content item. The method further comprises causing, at least in part, a rendering of the at least one content item on the opposite surface of the three-dimensional object based, at least in part, on the at least one target location.

According to another embodiment, an apparatus comprising at least one processor, and at least one memory including computer program code, the at least one memory and the computer program code configured to, with the at least one processor, cause, at least in part, the apparatus to determine a viewing location of a device with respect to a user interface, wherein the user interface depicts a three-dimensional object in which a surface closest to the viewing location is transparent to show, at least in part, an opposite surface of the three-dimensional object. The apparatus is further caused to determine at least one target location associated with at least one content item. The apparatus further causes, at least in part, a rendering of the at least one content item on the opposite surface of the three-dimensional object based, at least in part, on the at least one target location.

According to another embodiment, a computer-readable storage medium carrying one or more sequences of one or more instructions which, when executed by one or more processors, cause, at least in part, an apparatus to determine a viewing location of a device with respect to a user interface, wherein the user interface depicts a three-dimensional object in which a surface closest to the viewing location is transparent to show, at least in part, an opposite surface of the three-dimensional object. The apparatus is further caused to determine at least one target location associated with at least one content item. The apparatus further causes, at least in part, a rendering of the at least one content item on the opposite surface of the three-dimensional object based, at least in part, on the at least one target location.

According to another embodiment, an apparatus comprises means for determining a viewing location of a device with respect to a user interface, wherein the user interface depicts a three-dimensional object in which a surface closest to the viewing location is transparent to show, at least in part, an opposite surface of the three-dimensional object. The apparatus further comprises means for determining at least one target location associated with at least one content item. The apparatus additionally comprises means for causing, at least in part, a rendering of the at least one content item on the opposite surface of the three-dimensional object based, at least in part, on the at least one target location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart of a process for sharing user and content related information, according to one embodiment;

FIGS. 7A-7F are diagrams illustrating an augmented reality view employing a transparency effect, according to one embodiment;

FIG. 10 is diagram of a user interface utilized to update content access information, according to one embodiment;

FIG. 11 is a diagram of a user interface utilized to present an augmented reality world view of content, according to one embodiment;

DESCRIPTION OF SOME EMBODIMENTS

Examples of a method, apparatus, and computer program for presenting a world view of content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
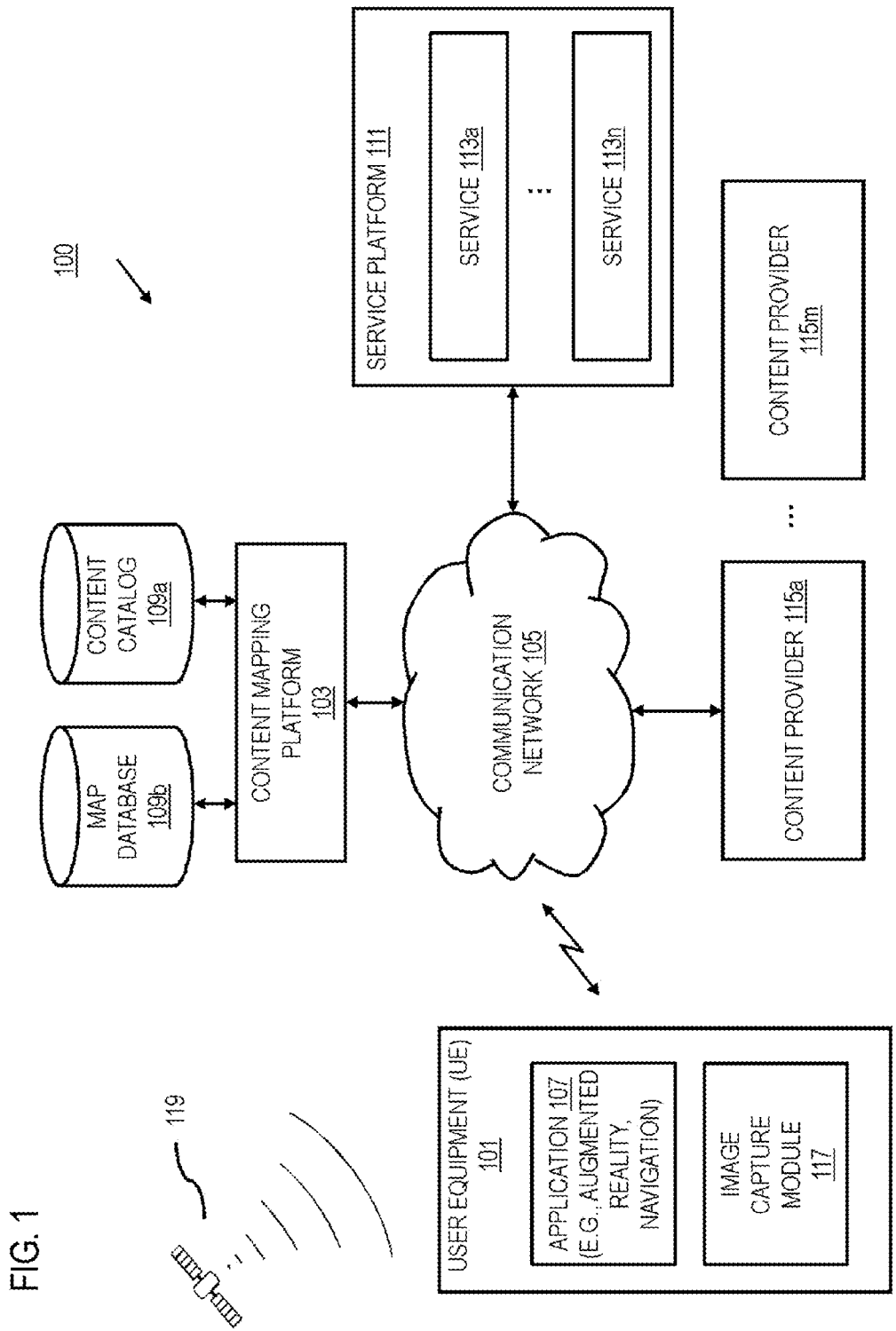
FIG. 1 is a diagram of a system capable of presenting a world view of content, according to one embodiment.

FIG. 1 is a diagram of a system capable of presenting a world view of content, according to one embodiment. As mentioned previously, a large amount of content (e.g., live/streaming online TV channels, media files, etc.) can be accessed over the Internet, using computers, mobile devices, and other Internet-connected devices. In many cases, the channels are globally available and free. In other words, the content or channels generally may originate from any place in the world for access by a device located in any other part of the world. However, some of the content can be limited or exclusive. For example, some content may be a part of pay services or may require registration, authentication, or some other pre-access process before a device can access the content. These limitations can be hard to determine without, for instance, the user first visiting the site or otherwise trying to access the content. Manually testing each potential content source for limitations or exclusivity can be quite resource intensive (e.g., time, bandwidth, etc.) and burdensome for the user to perform. As a result, user may be discouraged from exploring and/or accessing such content.

Even with some content being limited or exclusive, it is noted that there is still a vast collection of content and content related information available via service providers (e.g., over the Internet). This vast collection can quickly overwhelm the user, thereby making it extremely difficult for the user to identify and access content of interest. For example, one way to view a presentation of content over the Internet is via a content list. This traditional content list approach, however, may not be effective in situations where the density of information about content is high. More specifically, the high density of information can make lists long and interesting to a user. Moreover, the user may not find content interesting when that content is presented in a typical list buried among other items. Further, the user may wish to share the content or other related information (e.g., internet links, access data, content type, user location, content location, service provider, etc.) with other users so that they too can access the content, wherein the information may be shared via one or more methods such as short message service (SMS), multimedia messaging service (MMS), instant messaging (IM), social networking sites (e.g., Facebook®, YouTube®, Twitter®, etc.) and the like. Without an exciting or novel presentation, content that would otherwise appeal to users might go unnoticed and be missed.

To address the problems described above, a system 100 of FIG. 1 introduces the capability of presenting a simple and intuitive interface which gives the user a global view of currently available content. More specifically, the system 100 receives access information about potentially available content and automatically accesses the content as part of a verification process to determine availability information of the content. In one embodiment, the verification process may be performed at predetermined intervals (e.g., every 30 seconds, every 5 minutes, etc.) or at specified times to ensure that the availability information is up-to-date. Once the content is verified and availability information is determined, the system 100 generates a user interface to present the content or content information in interesting user interfaces. In the approach described herein, these user interfaces are based on depicting location information that is typically associated with the content. By way of example, the location information may indicate: (1) a broadcast location of the content, (2) a location that is the subject of the content, (3) a location where the content was captured, e.g., geo-tagged data, (4) a location of a provider of the content, or any other data or information to tie the content to a particular location. It is also contemplated that content may be associated with multiple locations.

In one embodiment, the system 100 presents representations (e.g., thumbnail images, animation, audio alerts, etc.) of the content on a map (e.g., a map of the world), wherein the content representations are displayed at locations corresponding to the location information associated with the content. In another embodiment, the system 100 shows content based on the three-dimensional (3D) direction along which a user device displaying the content is pointed. More specifically, the system 100 utilizes augmented reality (e.g., using live or actual images of a location) or augmented virtuality (e.g., using 3D models and 3D mapping information) to present a model of an map object (e.g., the Earth), seen in a first person view from the user device's current location so that the locations seen in the view match corresponding physical locations in reality. Although various embodiments are discussed with respect to the Earth as the three-dimensional map object, it is contemplated that the approach described herein is applicable to any map object including any real objects (e.g., a house, road, paper mill, etc.) and/or virtual objects (e.g., planned architectural models, renderings of fictitious objects, etc.). In yet another embodiment, depending on the location information, the first person view is rendered as though the user would see through map object (e.g., the Earth) to view the representation of the content. This view (e.g., a transparency effect) can be used, for instance, when the content location information indicates that the content is associated with a location sufficiently far from the user's location (e.g., the opposite side of the Earth) that the map object (e.g., the Earth) itself would be an obstruction between the user and the content.

In various embodiments, one or more users may share, with one or more other users, content related information such as internet links, access data, content type, user and/or content location (e.g., GPS coordinates, mapping location, etc.), service provider, and the like wherein the information may be shared via one or more methods such as short message service (SMS), multimedia message service (MMS), instant messaging (IM), social networking sites (e.g., proprietary service, public service, Facebook®, YouTube®, Twitter®, etc.) and the like, which may be send via one or more communication networks. The shared information may then be, at least in part, visually presented at a user device, for example, on a map or other applications with indicators (e.g., an arrow, a dot, text, an image, etc.) for providing guidance to access and/or discover the content. In one embodiment, information about a user location (e.g., source location) and location of the content accessed by the user (e.g., target location) can be presented on a user interface (UI) as a virtual tunnel through an object (e.g., the Earth). For example, if a user from the user's (source) location is viewing/looking/accessing content at a different (target) location, a viewing tunnel is formed between the two locations, which can be presented at a user device UI.

Further, as more user viewing tunnels are formed between different locations, the tunnels may be visually rendered such that there are one or more different characteristics distinguishing them, for example, by colors, by intensity of the colors or by other visual graphical representations. Furthermore, the visual representations of the tunnels may indicate how many users are utilizing a tunnel (e.g., may indicate more than 10, 50, 100, etc.), direction of the tunnel (e.g., one way or two way). In another embodiment, a user may save (e.g., bookmark, log, list, etc.) information related to content accessed and/or viewed at one or more locations wherein the information may be saved at the user device, at a service provider device and/or at a network component device (e.g., a cloud device) whereby the information may further be shared with and/or accessed by one or more users. In other embodiments, information related to the content, content access, tunnels and/or user information may be utilized in creating one or more user applications (e.g., gaming, entertainment, informative, educational, and the like) which may be rendered in one or more methods (e.g., 3D, 2D, a combination, etc.) on a user device. For example, by utilizing existing tunnels and/or creating new ones, the users (e.g., as a single user or in a team) may create and/or claim shapes and/or areas inside the Earth, which may be done in real time (e.g., online) or as an application on a user device (e.g., offline).

In other words, the view shows the user the content at a corresponding location on the other side of the map object where the user device is pointed. This view advantageously enables the user to understand how the map object as seen in the generated first person view relates to the physical world. Thus, the user becomes concretely aware of the nature (e.g., the spherical nature of the Earth). For instance, it is noted that although users are generally familiar that the Earth is round, they do not actively consider its meaning in the physical world: that they live on the surface of a spherical planet, and that most of the world is in fact located somewhere below their feet. For instance, if a person living in New York were asked where China is in reality, the person likely would reply with a compass direction (e.g., East of New York) or could not answer accurately at all. It is unlikely that the person would point along the most direct route through the Earth below the person's feet.

This lack of perspective or direction arises partly because traditional location based augmented reality systems lack the possibility to point to and/or search/browse content (e.g., geolocations, geo-tagged data, content associated with location information, etc.) anywhere on the Earth, including the other side of the world. Unlike the approach described herein, typical augmented reality solutions are suitable only for the range that is physically visible from the user's real physical location. The range can, in fact, be very short due to obstacles such as walls of buildings, and ultimately objects will drop below the horizon in the distance, making distant objects impossible to view in traditional augmented reality systems. Because the first person augmented reality view of the system 100 treats the Earth as if it were transparent, the system 100 does not suffer the same limitations of traditional systems with respect to rendering distant objects.

In another embodiment, the system 100 enables the user to browse available content by time as well as location. For example, the user can specify a time in the past, present, or future. The system 100 can then determine the availability of content with respect to the specified period of time and map the content based on the specified time. In this way, the user can view what content is available at any particular time. For example, to view upcoming content so that the user can plan what content to access, the user can specify a time period in the future and generate a corresponding content map to explore available content. Further, as noted above, the user may share one or more content related information with one or more other users. As shown in FIG. 1, a user equipment (UE) 101 may retrieve content information (e.g., content and location information) and mapping information (e.g., global maps, 3D maps, first person augmented reality views, etc.) from a content mapping platform 103 via a communication network 105. The content and mapping information can be used by an application 107 on the UE 101 (e.g., an augmented reality application, navigation application, or other location-based application). In the example of FIG. 1, the content mapping platform 103 stores content information in the content catalog 109a and mapping information in the map database 109*b*. By way of example, content information includes one or more identifiers, metadata, access addresses (e.g., network address such as a Uniform Resource Locator (URL) or an Internet Protocol (IP) address; or a local address such as a file or storage location in a memory of the UE 101), description, or the like associated with content. In one embodiment, content includes live media (e.g., streaming broadcasts), stored media (e.g., stored on a network or locally), metadata associated with media, text information, location information of other user devices, mapping data, geo-tagged data (e.g., indicating locations of people, objects, images, etc.), or a combination thereof. The content may be provided by the service platform 111 which includes one or more services 113*a*-113*n* (e.g., music service, mapping service, video service, social networking service, content broadcasting service, etc.), the one or more content providers 115*a*-115*m* (e.g., online content retailers, public databases, etc.), other content source available or accessible over the communication network 105. Further, the content and/or the content related information (e.g., in 109*a*, 109*b*, etc.) can be shared with and/or accessed by one or more users simultaneously, asynchronously, from same and/or different locations In certain embodiments, the mapping information and the maps presented to the user may be an augmented reality view, a simulated 3D environment, a two-dimensional map, or the like. In certain embodiments, the simulated 3D environment is a 3D model created to approximate the locations of streets, buildings, features, etc. of an area. This model can then be used to render the location from virtually any angle or perspective for display on the UE 101. In some programs (e.g., navigation application 107), the 3D model or environment enables, for instance, the navigation application 107 to animate movement through the 3D environment to provide a more dynamic and potentially more useful or interesting mapping display to the user. In one embodiment, structures are stored using simple objects (e.g., three dimensional models describing the dimensions of the structures). Further, more complex objects may be utilized to represent structures and other objects within the 3D representation. Complex objects may include multiple smaller or simple objects dividing the complex objects into portions or elements. To create the 3D model, object information can be collected from various databases as well as data entry methods such as processing images associated with location stamps to determine structures and other objects in the 3D model.

In addition or alternatively, the mapping information may be displayed using other user interfaces such as audio interfaces, haptic feedback, and other sensory interfaces. For example, in an audio presentation of the mapping information, the approximate locations of streets, buildings, features, points of interest, content, etc. can be read aloud by an voice synthesizer executing on the UE 101.

Additionally or alternatively, in certain embodiments, an image capture module 117 of the UE 101 may be utilized in conjunction with the application 107 to present content information, location information (e.g., mapping and navigation information), availability information, etc. to the user. The user may be presented with an augmented reality interface associated with the application 107 and/or the content mapping platform allowing 3D objects or other representations of content and related information to be superimposed onto an image of a physical environment on the UE 101. In certain embodiments, the user interface may display a hybrid physical and virtual environment where 3D objects from the map database 109 are placed superimposed on top of a physical image.

By way of example, the UE 101 may execute the application 107 to receive content and/or mapping information from the content mapping platform 103 or other component of the network 105. As mentioned above, the application 107 and content mapping platform 103 receive access information about content, periodically determines the availability of the content based on the access information, and then presents a unique global view of the content (e.g., a global map of available content or an augmented reality view of global content with a transparent Earth effect).

Moreover, map information stored in the map database 109*b* may be created from 3D models of real-world buildings and other sites. As such, objects can be associated with real world locations (e.g., based on location coordinates such as global positioning system (GPS) coordinates). In certain embodiments, the UE 101 may utilize GPS satellites 119 to determine the location of the UE 101 to utilize the content mapping functions of the content mapping platform 103 and/or the application 107. The map information may include a 3D model (e.g., a complex 3D model) of objects and structures in a physical environment (e.g., buildings) made up of a number of separate but adjoined simple 3D shapes such as polygons. Conventional approaches of 3D modeling include the ability to access and transform each polygon in size and shape separately from the other polygons that form the complete 3D model of the object.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, navigational device, multimedia computer, multimedia tablet, Internet node, communicator, desktop computer, laptop computer, Personal Digital Assistants (PDAs), or any combination thereof. For example, the UE 101 can be a device that simulates or provides a virtual telescope-like function. This type of UE 101 can be, for instance, mounted in a public place (e.g., a shopping center, hotel, etc.) to enable users to view content presented as described herein. It is also contemplated that the UE 101 can support any type of interface to the user (such as "wearable" circuitry, etc.).

By way of example, the UE 101, and content mapping platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the content mapping platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
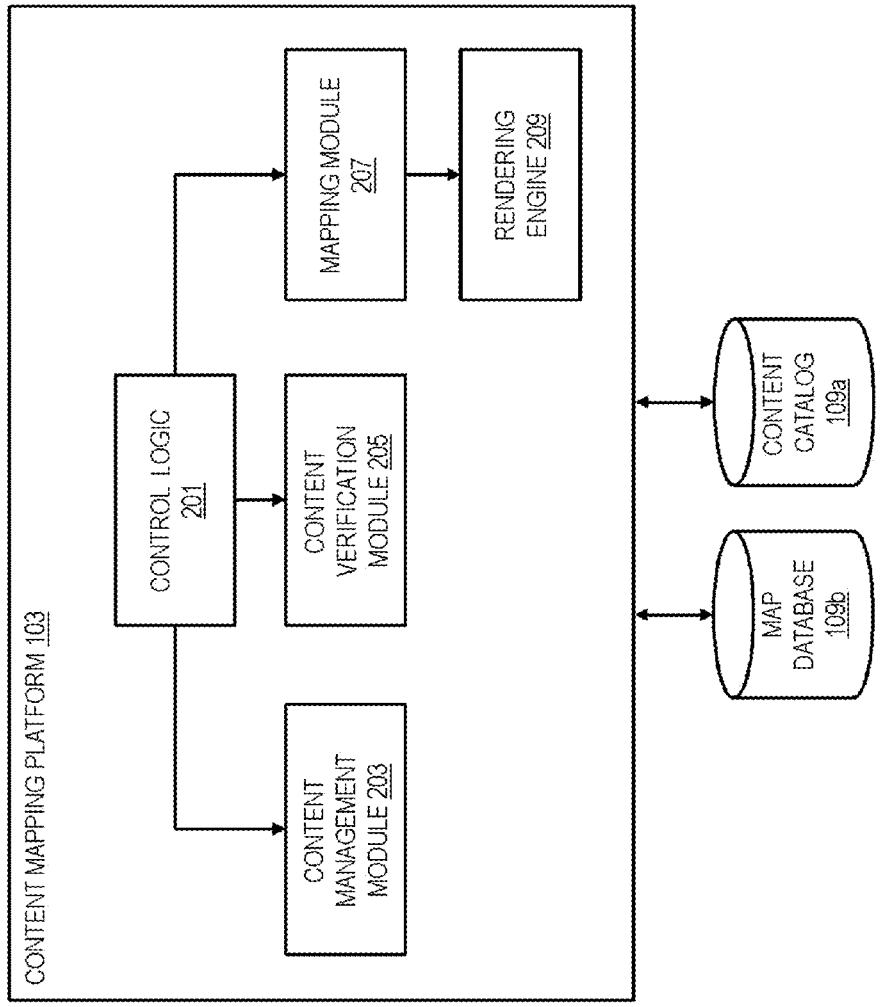
FIG. 2 is a diagram of the components of a content mapping platform, according to one embodiment.

FIG. 2 is a diagram of the components of a content mapping platform, according to one embodiment. By way of example, the content mapping platform 103 includes one or more components for presenting a global view of content. It is contemplated that the functions of these components may be combined in one or more components or performed by other components of equivalent functionality. In this embodiment, the content mapping platform 103 includes at least a control logic 201 which executes at least one algorithm for executing functions of the content mapping platform 103. For example, the control logic 201 interacts with a content management module 203 to receive access addresses corresponding to one or more content items. The access addresses may be received from the service platform 111, the services 113a-113n, the content providers 115a-115m, other like components, or a combination thereof. It is also contemplated that the user or another party authorized by the user may manually enter an access address of a content item. In one embodiment, the content management module 203 may create a content catalog listing all content items and associated access addresses provided to the content management module 203. In certain embodiments, the content catalog may include additional descriptive information and other metadata describing the content.

Next, the control logic interacts with the content verification module 205 to determine the availability or information about the availability of content. More specifically, the content verification module 205 verifies the status of a given content item (e.g., a live broadcast stream) by accessing the content at the corresponding access address. By way of example, the status includes: (1) whether the server hosting the content's access address is responding with the requested content; (2) whether there are any limitations or exclusivity restrictions on the content (e.g., does the content require authentication or registration before access); (3) whether the content is available for a certain period (e.g., only for a specific duration or only at specific times); and other like information. In one embodiment, the content verification module 205 can verify a particular content item before the content management module 205 adds the content item and related information to the content catalog. Alternatively, the content verification module 205 can perform the verification process continuously (e.g., a predetermined or fixed interval) by scanning the entire content catalog and updating the availability information accordingly.

Because the available media content or stream can take many forms (e.g., live video feeds, photographs, audio files, etc.) and can be delivered using any number means (e.g., streaming media, downloaded media, spontaneously created media, etc.), the content verification module 205 includes one or more sub-modules or application programming interfaces (APIs) (not pictured) for receiving and/or detecting the media content in its native format or for converting the media content to a media format compatible with the content mapping platform 103. In other embodiments, the content verification module 205 may initiate a download or installation of the components (e.g., codecs, player applications, etc.) needed to verify the content or stream.

After verification, the control logic 201 interacts with the mapping module 207 to correlate the location information associated with the one or more content items with respective locations on a map. In one embodiment, the location information may include coordinates (e.g., GPS coordinates) or other indicators (e.g., longitude and latitude information) that can be associated with an existing map. For example, the location information may be extracted or derived from any geo-tagged data (e.g., geo-tagged automatically or manually by the user) such as photographs, videos, audio recordings, and the like. This location information (e.g., GPS or other coordinates associated data) generally is recorded with the data when the data is captured or recorded. The mapping module 207 can then perform recognition (e.g., facial recognition, audio recognition, object recognition, etc.) on the data to identify people, locations, other subjects, or related information in the data. The identified people, locations, etc. can then be associated with the extracted location information. In addition or alternatively, it is contemplated that the location information or geo-tagged data could also be created by the mapping module 207 by deriving the location from associated metadata (e.g., media titles, tags, and comments). More specifically, the mapping module 207 can parse the metadata for any terms that indicate association with a particular location. For instance, a family vacation photograph may be tagged with a description of "Paris Vacation." The mapping module 207 can parse "Paris Vacation" using a natural language model to associate the photograph with Paris, France even though the photograph does not include any traditional location information (e.g., GPS coordinates).

The mapping module 207 then interacts with the rendering engine 209 to present the location information, content information, and other content related information using any type of visual user interface (e.g., augmented reality view, 3D maps, etc.), audio user interface, tactile or tangible user interface (e.g., haptic feedback), or any possible user interface or combination of user interface types.

Figure 3:
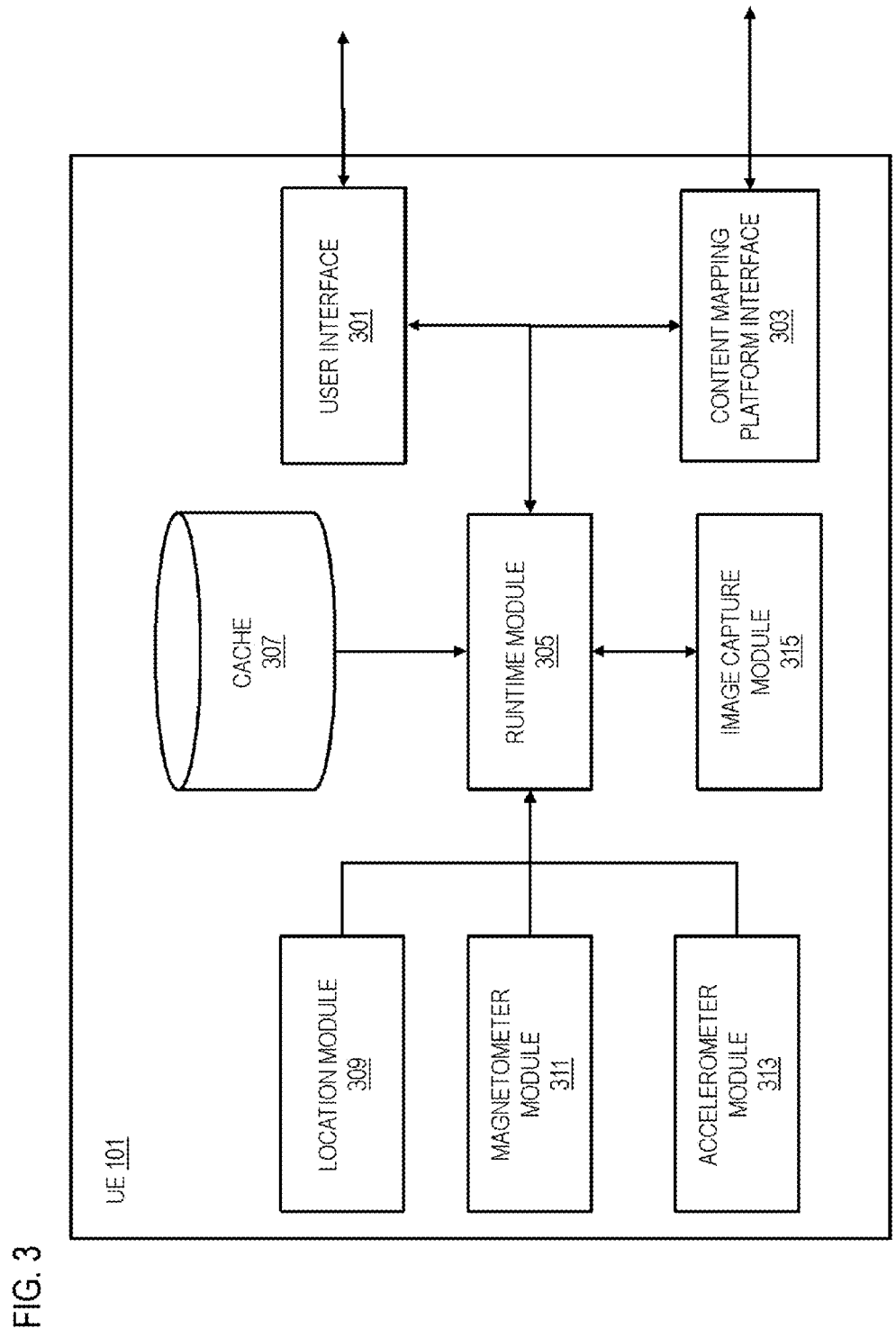
FIG. 3 is a diagram of the components of user equipment capable of presenting a world view of content, according to one embodiment.

FIG. 3 is a diagram of the components of user equipment capable of presenting a world view of content, according to one embodiment. By way of example, the UE 101 includes one or more components for presenting availability information, location information, content information of content accessible over the communication network 105 in user interface. It is contemplated that the functions of these components may be combined in one or more components or performed by other components of equivalent functionality. In this embodiment, the UE 101 includes a user interface 301 to present content information and receive input, a content mapping platform interface 303 to retrieve content and mapping information from the content mapping platform 103, a runtime module 305, a cache 307 to locally store content and mapping information, a location module 309 to determine a location of the UE 101, a magnetometer module 311 to determine horizontal orientation or directional heading (e.g., a compass heading) of the UE 101, an accelerometer module 313 to determine vertical orientation or an angle of elevation of the UE 101, and an image capture module 117.

Content and mapping information may be presented to the user via the user interface 301, which may include various methods of communication. For example, the user interface 301 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start an application 107 (e.g., a mapping or augmented reality application) and utilize the user interface 301 to receive content and mapping information. Through the user interface 301, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101.

The content mapping platform interface 303 is used by the runtime module 305 to communicate with the content mapping platform 103. In some embodiments, the interface is used to fetch content, mapping, and or location information from the content mapping platform 103, service platform 111, and/or content providers 115a-115m. The UE 101 may utilize requests in a client server format to retrieve the content and mapping information. Moreover, the UE 101 may specify location information and/or orientation information in the request to retrieve the content and mapping information. The location module 309, magnetometer module 311, accelerometer module 313, and image capture module 117 may be utilized to determine location and/or orientation information used in determining along which direction the UE 101 is pointed so that content and mapping information corresponding to the pointed direction can be retrieved. Further, this content and mapping information may be stored in the cache 307 to be utilized in presenting a world view of content at the UE 101.

In one embodiment, the location module 309 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 309 may also utilize multiple technologies to detect the location of the UE 101. GPS coordinates can provide finer detail as to the location of the UE 101. As previously noted, the location module 309 may be utilized to determine location coordinates for use by the application 107 and/or the content mapping platform 103.

The magnetometer module 311 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which geographic feature or object) the UE 101 is pointing towards. This information may be utilized to select a first person view to render content and mapping information.

Further, the accelerometer module 313 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 313 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint to provide content and mapping information to the user. As such, this information may be utilized in selecting available content items to present navigational information to the user. Moreover, the combined information may be utilized to determine portions of a particular 3D map or augmented reality view that may interest the user. In one embodiment, if the location information associated with one or more available content items does not correspond to the viewpoint (e.g., is not visible in the selected viewpoint), one or more indicators (e.g., arrows or pointers) may be showed on the user interface to indicate the direction towards the location of the content items.

In another embodiment, the user may manually input any one or more of the location, directional heading, and tilt angle to specify a viewpoint for displaying the user interface on the UE 101 instead of determining the viewpoint from the sensors. In this way, the user may select a "virtual viewpoint" to be a place other than the current location and pointing direction of the UE 101.

Figure 4:
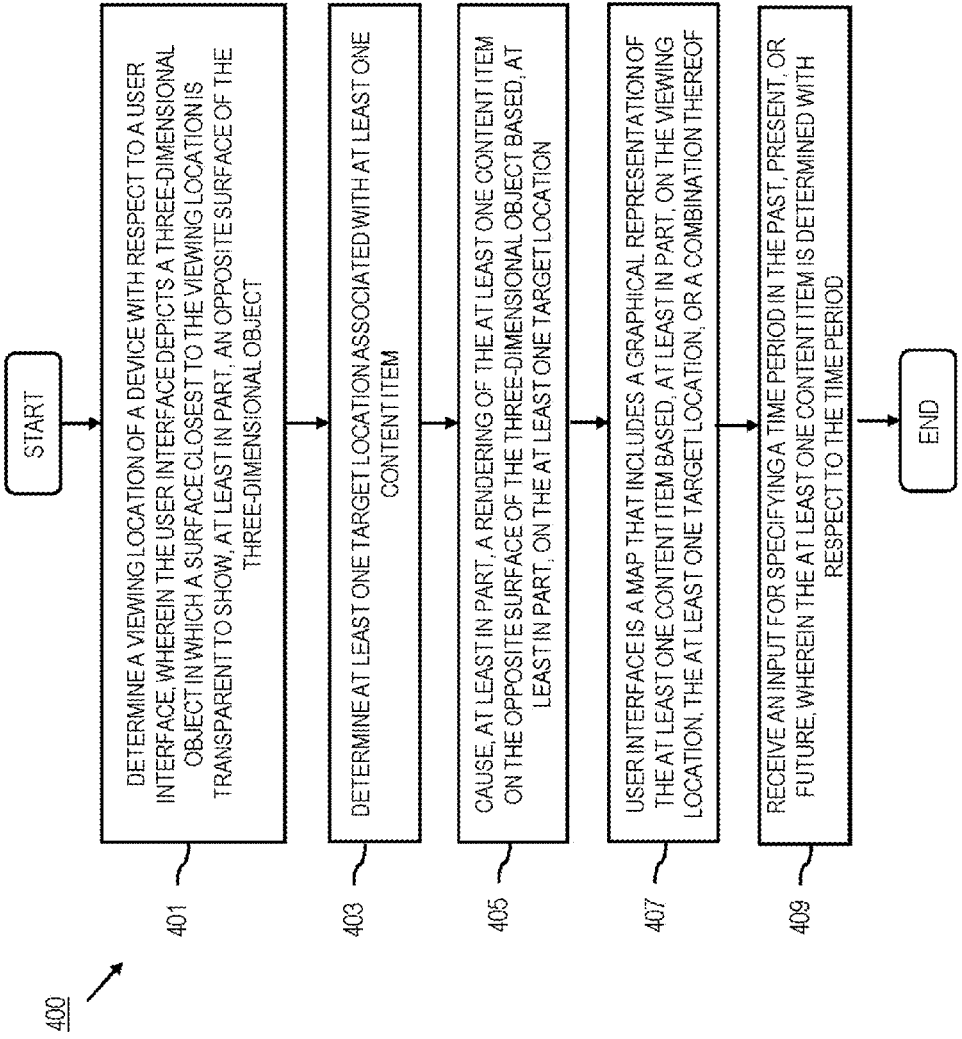
FIG. 4 is a flowchart of a process for determining and presenting the user and content locations, according to one embodiment.

Images for supporting a graphical user interface can be captured using an image capture module 117. An image capture module 117 may include a camera, a video camera, a combination thereof etc. In one embodiment, visual media is captured in the form of an image or a series of images. The image capture module 117 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve content and mapping information from the map cache 307 or the mapping platform 103. In certain embodiments, the cache 307 includes all or a portion the information in the content catalog 109*a* and the map database 109*b*. Further, the content and/or the content related information (e.g., in 109*a*, 109*b*, etc.) can be shared with and/or accessed by one or more users simultaneously, asynchronously, from same and/or different locations. For example, John in London is accessing (e.g., via a tunnel) content in Los Angeles and wishes to have his friend, Ann, in New York access the same content, so he sends her an SMS including content related information (e.g., location coordinates of John, content type, location coordinates of the content, content availability time, and the like) so that Ann could utilize one or more information items for accessing the content; further, since John and Arm may be on a close latitudinal line, tunnels shown on their respective user devices may be substantially presented within one tunnel or alternatively may be presented as two different tunnels. In another example, Ann may communicate (e.g., via IM) substantially same content related information to her friend, Ken, in Miami who may establish a new tunnel for accessing substantially same content as John and Ann. In the previous examples, there may be one, two or three tunnels from London, New York and Miami for accessing the content in Los Angeles wherein the presentations on the respective devices may be rendered via one or more applications (e.g., a map) on the devices in one or more formats (e.g., 2D, 3D, textual, etc.) wherein the respective tunnels may be presented along with one or more other tunnels utilized by other users. Alternatively, a user may configure the user device to render and present tunnels based on user defined criteria such as user name, content type, tunnel origin/source, tunnel end-point/target and the like. FIG. 4 is a flowchart of a process for determining the availability of content, according to one embodiment. In one embodiment, the runtime module 305 performs the process 400 and is implemented in, for instance, a chip set including a processor and a memory as shown FIG. 13. In certain embodiments, the content mapping platform 103 may perform some or all of the steps of the process 400 and communicate with the UE 101 using a client server interface. The UE 101 may activate an application 107 to utilize content mapping services of the content mapping platform 103. Moreover, the application 107 may execute upon the runtime module 305.

In step 401, the runtime module 305 determines a viewing location of a device with respect to a user interface, wherein the user interface depicts a three-dimensional object in which a surface closest to the viewing location is transparent to show, at least in part, an opposite surface of the three-dimensional object. In various embodiments, one or more sensors (e.g., GPS), one or more applications, one or more service providers and or communications network information (e.g., cell location) can provide information, at least in part, indicative of the user device location and/or viewing location. For example, GPS information can substantially indicate on a map (e.g., 2D, 3D) location of one or more user devices whereby one or more users can establish as their viewing location. Further, one or more UE 101 applications render on a UI a 3D and/or a 2D view of an object (e.g., Earth) with one or more indicators indicating viewing location of the one or more users. For example, on the UE 101 UI a 3D rendering of the Earth can be presented while indicating viewing locations of users in Los Angeles, Helsinki, Beijing and Buenos Aires located closest to the surface of the 3D Earth rendering (e.g., each user is shown at their respective location on the 3D Earth rendering). Furthermore, the 3D rendering of the object (e.g., Earth) is substantially transparent so that the users from their viewing locations may view one or more contents located at the opposite side of the object. For example, a user located in Helsinki may view one or more contents located at or near Tokyo through the transparent rendering of the Earth.

In step 403, the runtime module 305 determines at least one target location associated with at least one content item. By way of example, the at least one content item and related data may comprise one or more of: (1) media content (e.g., live or stored media, streaming media, web cam feeds, photographs, metadata related to the media content, metadata related to the location information of the media content, etc., or a combination thereof); (2) mapping information (e.g., any available map data); (3) text information (e.g., descriptive labels such as "Venice, Italy"); (4) location information of other users (e.g., friends, coworkers, etc.) and associated avatars, photographs, text, etc.; (5) time of day (e.g., night-time regions can be visualized in darker colors, or working hours regions can be presented differently than non-working hour regions); and (6) natural phenomenon (e.g., ocean currents, hurricanes, environmental conditions, other weather events. It is contemplated that content and other related data are not limited to the above listed categories.

In Step 405, the runtime module 305 causes, at least in part, a rendering of the at least one content item on the opposite surface of the three-dimensional object based, at least in part, on the at least one target location. In one embodiment, from the selected viewpoint, an image representing an augmented reality view or a 3D model of the location corresponding to the viewpoint can be generated or retrieved from the cache 307 or the content mapping platform 103. As previously noted, the image may represent a physical environment; maybe located at any point (e.g., geographically opposite) on the three dimensional object; which may be captured using an image capture module 117 of the UE 101. In another embodiment, the image may represent a virtual 3D environment, where the user's location in the real world physical environment is represented in the virtual 3D environment. In the representation, the viewpoint of the user is mapped onto the virtual 3D environment. Moreover, a hybrid physical and virtual 3D environment may additionally be utilized to present navigational information to the user.

In step 407, as an alternative to the augmented reality or globe view user interface, the runtime module 305 can render a user interface as a map that includes a graphical representation of the at least one content item based, at least in part, on the viewing location, the at least one target location, or a combination thereof. In one embodiment, the rendering can provide a simple and intuitive map view of the content items and their corresponding location. In this view, the runtime module 305 renders graphical representations of the content items and places them on the map according to the location information corresponding to each content item. As with the augmented reality view point, the zoom and detail levels of the display can be varied to ensure that the map is not completely obscured. Additionally, content items can be animated to appear and disappear from the view based on date, user preferences, or other criteria to further reduce number of contents to display.

In step 409, the runtime module 305 may receive an input for specifying a time period in the past, present, or future, wherein the at least one content item is determined with respect to the time period. By enabling specification of a time period, the approach described herein enables the user to navigate content information using both location and time. In one embodiment, the default time for viewing the content and mapping information is the present.

Figure 5:
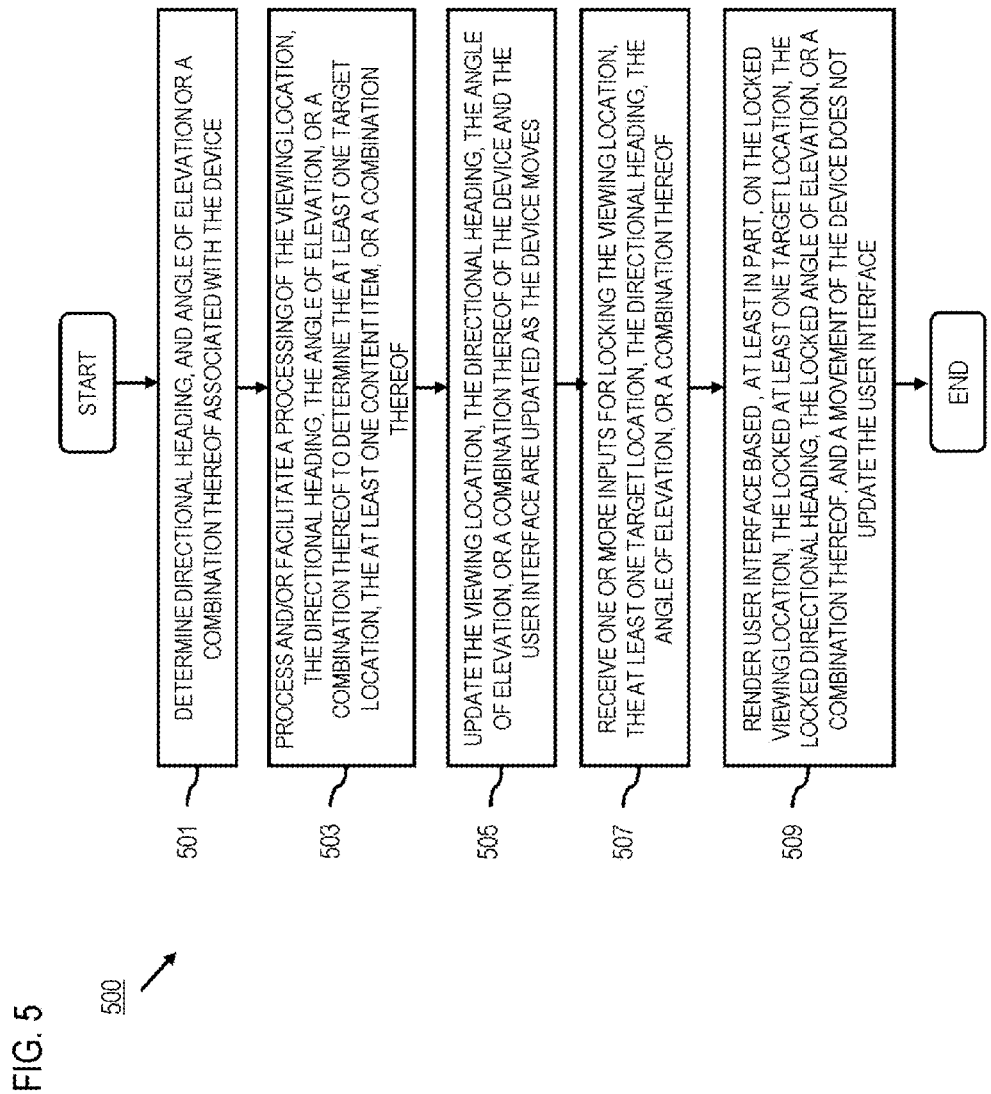
FIG. 5 is a flowchart of a process for determining and presenting a user interface depicting a content access directions, according to one embodiment.

FIG. 5 is a flowchart of a process for presenting a user interface depicting a first person world view of content, according to one embodiment. In one embodiment, the runtime module 305 performs the process 500 and is implemented in, for instance, a chip set including a processor and a memory as shown FIG. 13. The process 500 assumes that the runtime module 305 has already completed the process 300 for verifying content items and is now determining the type of user interface for rendering the verified content and location information.

In step 501, the runtime module 305 determines a directional heading, an angle of elevation, or a combination thereof associated with the device UE 101 in order to determine a viewpoint from which to render the view. In one embodiment, the viewpoint parameters (e.g., location, direction heading, and angle of elevation of the UE 101) are determined by pointing the user UE 101 at a specific place in the physical world. More specifically, to determine where the UE 101 is pointed, the runtime module 305 may utilize the location module 309, magnetometer module 311, accelerometer module 313, or a combination thereof. In other embodiments, the user may select the viewpoint based on a 3D environment. The user may select the viewpoint based on conventional means of searching a map or 3D map (e.g., by selecting a starting point and traversing the map or entering location coordinates, such as GPS coordinates or an address, of the viewpoint).

In step 503, the runtime module 305 processes and/or facilitates a processing of the viewing location, the directional heading, the angle of elevation, or a combination thereof to determine the at least one target location, the at least one content item, or a combination thereof. By way of example, one or more directional guidance information may be presented via the UI at a user device wherein the user may utilize the guidance information for pointing the user device and find one or more contents. For example, the guidance information may be presented as arrows, one or more series of points, series of dots to connect, textual instructions, flashing lights and the like. Further, the user may utilize the guidance direction for moving the user device in one or more was such as move to the left, right, up, down, change angle of elevation and the like in order to substantially point to the desired content. Furthermore, if the device is capable of self-orientation/self-movement (e.g., motorized change of direction while the device is affixed at one point), then the user device may utilize the guidance information for substantially automatically aligning the user device and point to the desired content. As an alternative, another user device (e.g., a personal computer) may utilize the guidance information for aligning/pointing the user device (e.g., via a motorized mechanism wherein the user device UE 101 is affixed to) UE 101 to the desired content.

In step 505, the runtime module 305 updates the viewing location, the directional heading, the angle of elevation, or a combination thereof of the device and the user interface as the device moves. To facilitate finding specific content or features, the runtime module 305 enables the user input search criteria (e.g., a content item, person, city, weather, etc.) and get guidance for finding the direction where the searched content item is located in the real physical world. By way of example, the guidance may be indicated as a directional arrow or other similar indicator in the augmented reality display to indicate the direction the user should move or point the UE 101 in order to find the searched content item. Therefore, as the user moves the UE 101a, the runtime module 305 updates the rendering of the user interface to reflect the new viewpoint.

As noted previously, an inherent property of an augmented reality user interface is that the display follows the movement and pointing of the UE 101. However, in some cases (e.g., when the user has found and is displaying a favorite location), the user may wish to "lock" or fix the display at a particular viewpoint without having to maintain the UE 101 in the same position. Accordingly, at step 507, the runtime module receives one or more inputs for locking the viewing location, the at least one target location, the directional heading, the angle of elevation, or a combination thereof. This input may be initiated, for instance, selecting a menu option or actuating a physical button (e.g., a shutter release of the image capture module 117).

In step 509, the user interface is rendered based, at least in part, on the locked viewing location, the locked at least one target location, the locked directional heading, the locked angle of elevation, or a combination thereof and a movement of the device does not update the user interface. In one embodiment, the image capture module 117 may also be used to "lock" the viewpoint of the UE 101, so that even if the UE 101 is moved or turned away, the runtime module 305 renders the content from the locked viewpoint. In this way, the user can select a favorite viewpoint (e.g., a view of New York City through the transparent Earth) and monitor the development of evolution of available content originating from the location in the locked viewpoint. It is further contemplated that the user may store one or more of the locked viewpoints for later reference or recall.

FIG. 6 is a flowchart of a process for determining the availability of content, according to one embodiment. In one embodiment, the runtime module 305 performs the process 600 and is implemented in, for instance, a chip set including a processor and a memory as shown FIG. 13. In certain embodiments, the content mapping platform 103 may perform some or all of the steps of the process 600 and communicate with the UE 101 using a client server interface. The UE 101 may activate an application 107 to utilize content mapping services of the content mapping platform 103. Moreover, the application 107 may execute upon the runtime module 305.

In step 601, the runtime module 305 causes, at least in part, a rendering of at least one connection between the viewing location and the at least one target location, wherein the rendering of the least one connection is depicted as at least one tunnel. By way of example, connection between a viewing location (e.g., user location, source location) and the target location (e.g., geographical location of the content) are represented as one or more tunnels in a user interface rendering. The one or more tunnels can have one or more characteristics (e.g., color, pattern, size, shape, 2D, 3D, et.) so that the one or more users may be able to determine further information about the one or more tunnels (e.g., user's own tunnel(s), tunnel direction(s), tunnel users, etc.)

In step 603, the runtime module 305 causes, at least in part, a sharing of the at least one target location, the viewing location, the at least one content item, or a combination thereof with one or more other devices. In one embodiment, the one or more users may share content related information such as location of the one or more users, location of the one or more contents, tunnel information, content availability times, tunnel access level required, content access level required and the like.

In step 605, the runtime module 305 processes and/or facilitates a processing of the shared at least one target location, the viewing location, the at least one content item, or a combination thereof to determine frequency information, popularity information, or a combination thereof. In one embodiment, the content related information may be utilized, for example, by the users and/or a service provider to ascertain further information about the frequency and/or popularity information which may further provide, at least in part, additional criteria for deciding to utilize and/or share the content and/or the content related information.

In step 607, the runtime module 305 renders the user interface, the at least one content item, the viewing location, the at least one target location, or a combination thereof based, at least in part, on the frequency information, the popularity information, or a combination thereof. By way of example, the frequency and/or the popularity information determined, at least in part, may be utilized to render (e.g., organize, categorize, list, prioritize, highlight, etc.), for example, the content and/or the content related information via one or more applications on the user device UE 101. For example, a user may discover a very popular tunnel (e.g., indicating a popular content and/or target location) and decide to share information related to the content and/or the tunnel with one or more other users by any of the earlier mentioned methods (e.g. SMS, MMS, IM, etc.)

In step 609, the runtime module 305 causes, at least in part, a coordination of a selection of the viewing location, one or more other viewing locations, the at least one target location, or a combination thereof among the device, one or more other devices, or a combination thereof based, at least in part, on the sharing, wherein the coordination supports, at least in part, one or more gaming applications. By way of example, the content related information such as information related to the user, target, source, content, tunnels and the like can be utilized to, at least in part, arrange, construct, program one or more applications which may be utilized for entertainment, education, gaming and the like. For example, one or more users may utilize, on their respective device UI's, a 3D rendering of Earth with indications of one or more tunnels, to create one or more different areas within the Earth rendering and interact (e.g., claim, divide, purchase, rent, trade, cross, block, etc.) with the rendering amongst the participating users.

From the selected viewpoint, an image representing an augmented reality view or a 3D model of the location corresponding to the viewpoint can be generated or retrieved from the cache 307 or the content mapping platform 103. As previously noted, the image may represent a physical environment, which may be captured using an image capture module 117 of the UE 101. In another embodiment, the image may represent a virtual 3D environment, where the user's location in the real world physical environment is represented in the virtual 3D environment. In the representation, the viewpoint of the user is mapped onto the virtual 3D environment. Moreover, a hybrid physical and virtual 3D environment may additionally be utilized to present navigational information to the user.

The runtime module 305 can then further render or indicate the location and availability information of one or more content items in the augmented reality user interface. It is noted that to enable seeing the globe effect and the content simultaneously, the amount of content shown can be restricted or reduced (e.g., using adjustable zoom or detail levels) so that content labels do not obscure the globe. In certain embodiments, when there is much more content available than can be displayed in the existing globe view use interface, the runtime module 305 can be constantly animating the display of the content items so that new content keeps appearing while older content disappears. This animation process also makes the user interface more entertaining to users and gives a feeling of the world being "alive" with activity.

Additionally, because of the large scale of the world, fine granularities of distances are not readily displayed or visible in the rendered user interface. Accordingly, the exact locations of people and content are less important which can guard against some privacy concerns when sharing people tracking data. For example, when rendering the augmented reality view from across the globe, the scale of the display enables the runtime module 305 to indicate a specific location with accuracy to generally the city or regional level. As a result, the large scale of the view limits how accurately the location tracking data can be displayed, thereby protecting the privacy of those participating in the people tracking service.

In certain embodiment, the user may specify a zooming range or granularity for rendering the user interface. For example, the user may have the option to select a range for distance (e.g., a display scale) or a level of accuracy or sensitivity for determining the viewpoint (e.g., the location, directional heading, and tilt angle) of the UE 101. The range selection can use traditional numerical input or natural language input (e.g., outer space, the sky above the buildings, above ground on the other side of the Earth, etc.). The range may also be specified by zooming controls in a touch-based user interface, or a slider, actuator, knob, or other similar user interface element. Moreover, it is contemplated that the sensitivity for determining the viewpoint can be automatically adjusted based on the zoom, thereby advantageously reducing the effects of the natural unsteadiness of the user's pointing of the UE 101 that is exacerbated at higher levels of zoom. As zoom increases, the exact locations of the location tracking subjects may be automatically obscured to protect the privacy of the location tracking subjects or other location information displayed in the user interface.

The zoom level also affects the amount of content or other data that can be displayed in the user interface. In addition, the user can add filters (e.g., based on content subject, type, etc.) to select the types of content to display in the user interface. In one embodiment, the user can also define the range where content is visible in the user interface, so that the user can, for instance, see only the content around a particular city that is near the horizon. Another example would be to define a very short range for viewing subway lines under a city. In yet another embodiment, the user interface may employ a visualization method similar to a camera auto-focus, so that the content that is under the "point of focus" is rendered normally, while the rest of the view user interface is blurred as if it was out of focus. In this way, the user interface more clearly presents the content at which the viewpoint is directed. As the viewpoint changes from one content item to the next, the focus can shift accordingly.

An inherent property of an augmented reality user interface is that the displayed content is dependent on the viewpoint and that to view a specific point or content located on the Earth, the user has to point the UE 101 in the correct direction. In addition or alternatively, the user may specify a particular viewpoint by entering at least one of a location, directional heading, and tilt angle rather than point the UE 101 manually. In this way, the user can virtually aim the UE 101 instead of manually pointing. Based on the manually specified viewpoint, the user interface may be rendered to depict the scene virtually using, for instance, such as a wireframe rendering, a tunnel or pipe graphical element, or other indication to signify that the presentation is based on a virtual viewpoint.

Figure 7A:
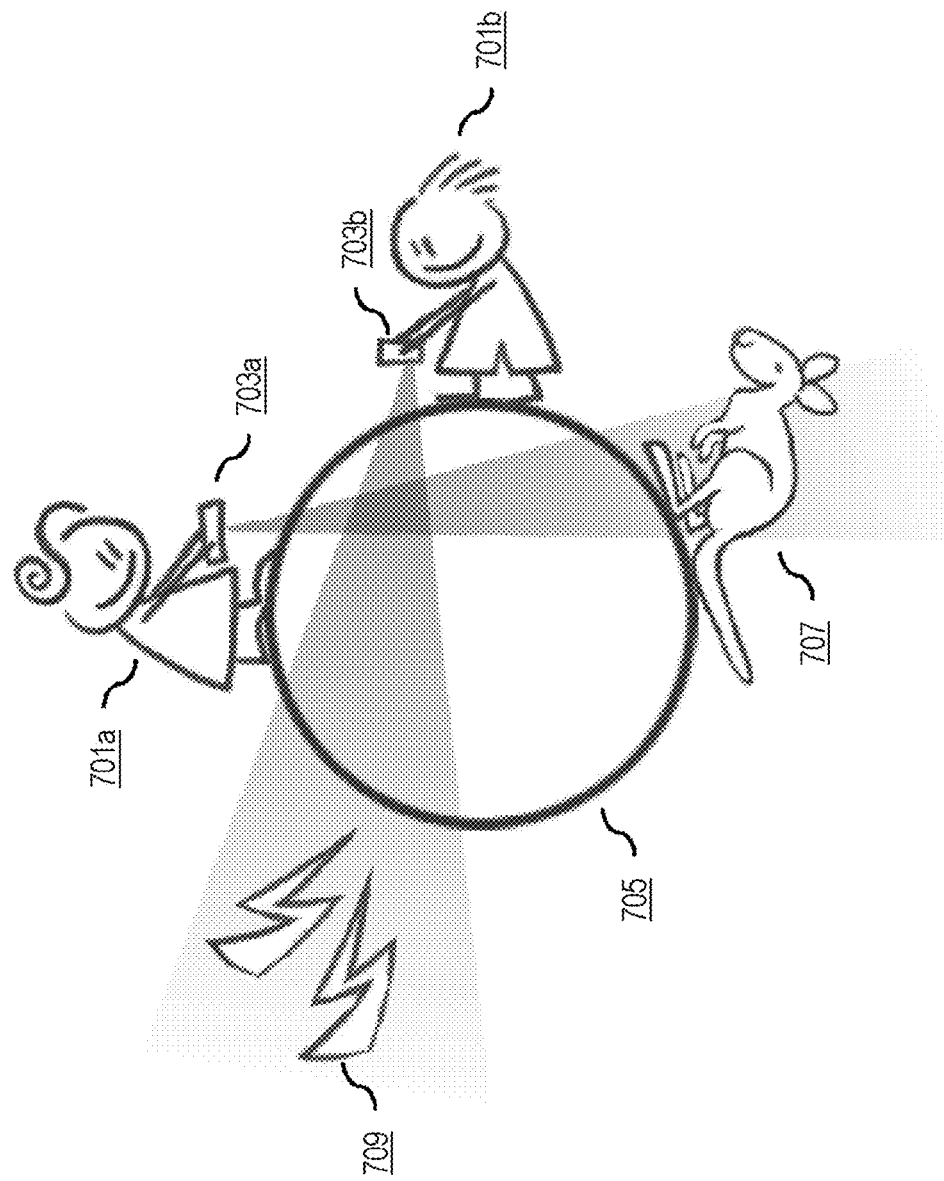

FIGS. 7A-7F are diagrams illustrating an augmented reality view employing a transparency effect, according to one embodiment. As shown in FIG. 7A, a user 701a points a user device 703a towards the Earth 705 to view an augmented reality display of a content item 707 (e.g., a location of a kangaroo) located on the opposite side of the Earth 705. Similarly, a user 701b points a user device 703b through Earth 705 to view a content item 709 (e.g., location of a lightning storm) on the opposite side of the Earth 705. In both cases, the augmented reality view renders the Earth 705 as if the Earth 705 were transparent by showing a representation of the respective content items 707 and 709 unhindered by any obstruction in the graphical user interfaces of the respective user devices 703a and 703b. As described previously, rendering a transparent Earth 705 effect provides for a unique and interesting view of global content.

Figure 7B:
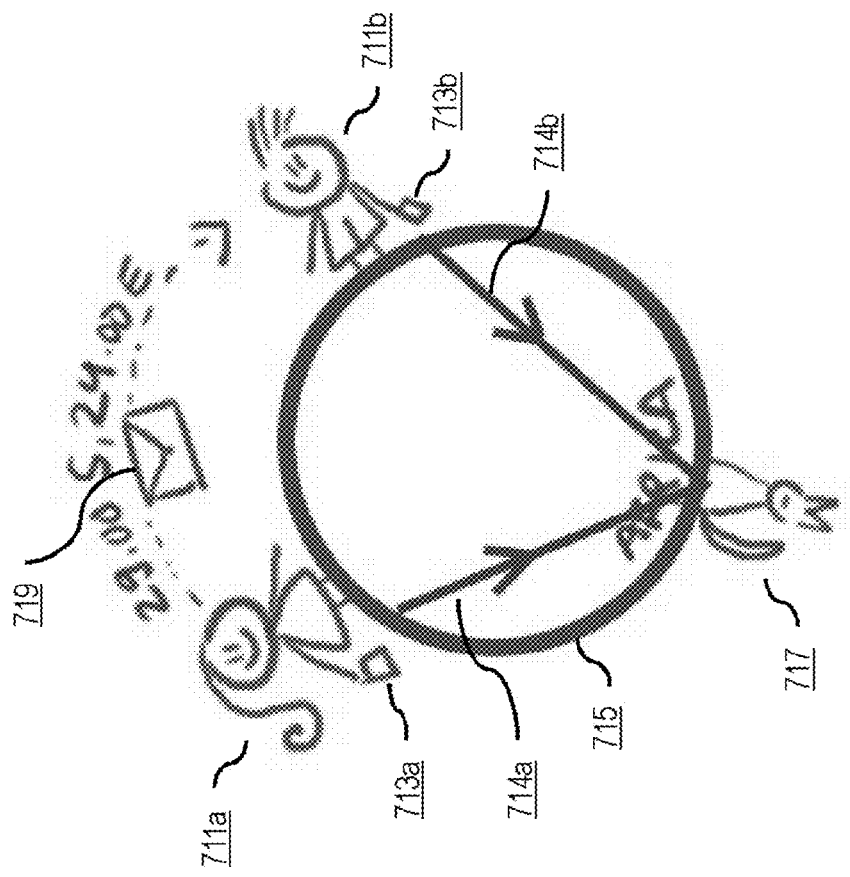

FIG. 7B is a diagram illustrating an augmented reality view employing a transparency effect and sharing between users, according to one embodiment. As shown, a user 711a points a user device 713a towards the Earth 715 to view an augmented reality display of a content item 717 (e.g., a kangaroo) located on the opposite side of the Earth 715 (e.g., in Africa) wherein a tunnel 714a is rendered on the UI of the user device 713a indicating, for example, the connection between the user 711a and content 717. Further, the user 711a shares content related information 719 (e.g., internet links, access data, content type, user and/or content location, GPS coordinates, mapping location, service provider, and the like) with another user 711b for viewing/consuming the content 717. It is noted that the user 711b may be co-located with the user 711a or may be at a different location. Here, once the user 711b receives and/or accesses the content related information 719 may access the content 717 via tunnel 714b. In both cases, the augmented reality view renders the Earth 715 as if the Earth 715 were transparent by showing a representation of the respective content items 717 unhindered by any obstruction in the graphical user interfaces of the respective user devices 713a and 713b. As described previously, rendering a transparent Earth 715 effect provides for a unique and interesting view of global content. It is further noted that one or more users may be at one or more locations and may access one or more contents at one or more locations wherein the accesses may be visually rendered as one tunnel or as multiple different tunnels.

Figure 7C:
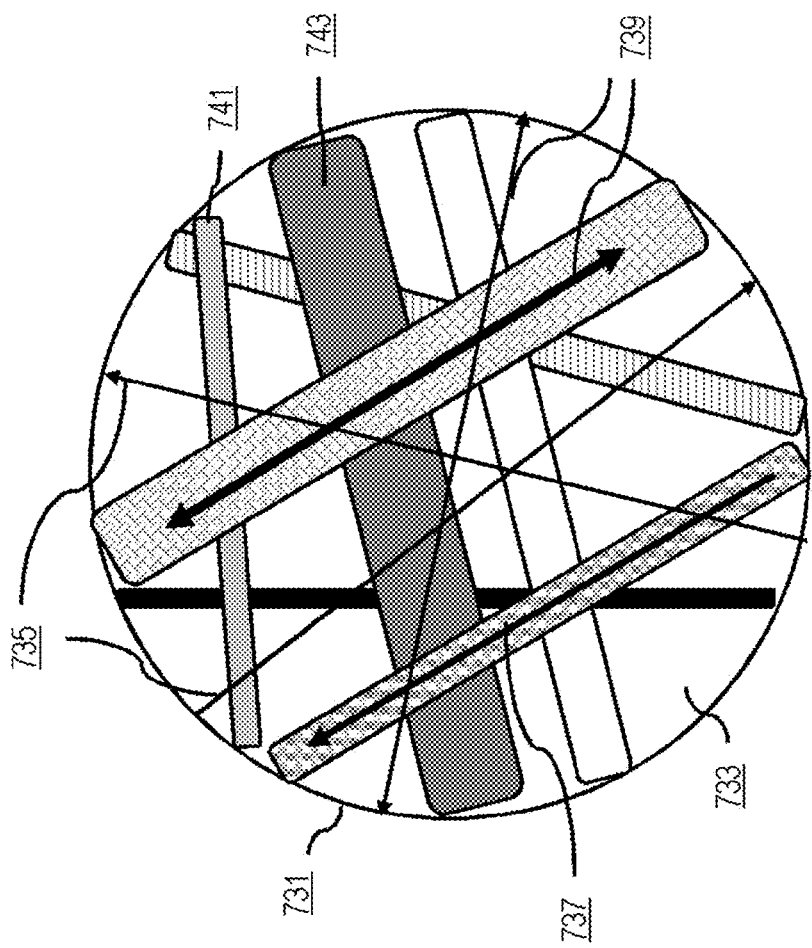

FIG. 7C is a diagram illustrating an augmented reality view employing a transparency effect and one or more potential tunnels, which may be a representation of current or past tunnels. Indicator 731 is a transparent representation of a three dimensional object (e.g., Earth) wherein renderings of one or more tunnels 733 are presented in a UI. As shown, the tunnels may be represented with one or more different graphical characteristics (e.g., color, shading, pattern, emphasis, etc.) so that the users may be able to search/detect one or more current or past tunnels. Further, indicators 735 and 737 point to example tunnels wherein direction from user/source to content/target, or vice versa, is indicated; or as in 739, the one or more tunnels can be bidirectional where there may be one or more users/sources and one or more contents/targets present at both ends of the one or more tunnels. In another example, as in 741, one or more graphical characteristics (e.g., colors, shades, pattern, etc.) may be utilized to indicate direction of the one or more tunnels. Furthermore, indicator 743 points to a tunnel that is presented as a wider tunnel, which may indicate that there are many users and/or tunnels (e.g., popular) utilizing that tunnel to access one or more contents which may be geographically located close to each other.

FIGS. 7D and 7E are diagrams illustrating example UI renderings. In FIG. 7D, users 751, 753 and 755 are utilizing 751a, 753a and 755a for accessing and or sharing one or more contents and further can cause arranging the tunnels such that it can render one or more graphical shapes (e.g., triangle). Alternatively, FIG. 7E depicts a user 761 who, for example, has travelled to different locations on Earth, has caused multiple tunnels which can be saved in a user history log on a user device and/or at a service provider and which can render one or more geometrical shapes when presented together in a UI.

Figure 7F:
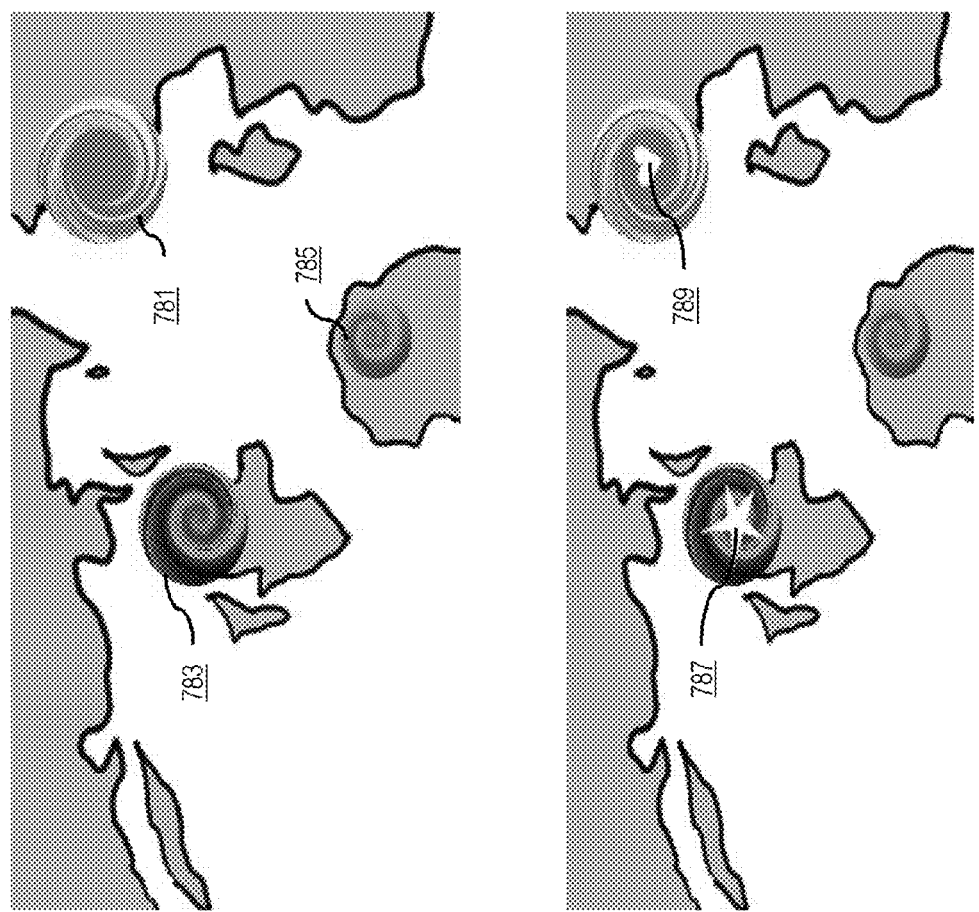

FIG. 7F shows example renderings on a map application of multiple tunnels wherein the tunnels are indicated by one or more spiral shapes 781, 783, and 785. Further the spirals can have one or more characteristics such as color, size, direction, 2D, 3D and the like. Indicators 787 and 789 point to other example characteristics (e.g., graphical, textual, etc.) which can indicate additional information, such as type of traffic, viewed content, favorite, saved in one or more logs/lists, users' information associated with the one or more tunnels, and the like. In on example, size of a spiral 781 can indicate more users and/or more traffic via that tunnel. Furthermore, as another characteristic, direction of traffic could be visualized by animation, arrows, light beams and the like. Also, it is noted that any shape or combinations of shapes may be used as indictors.

Figure 8:
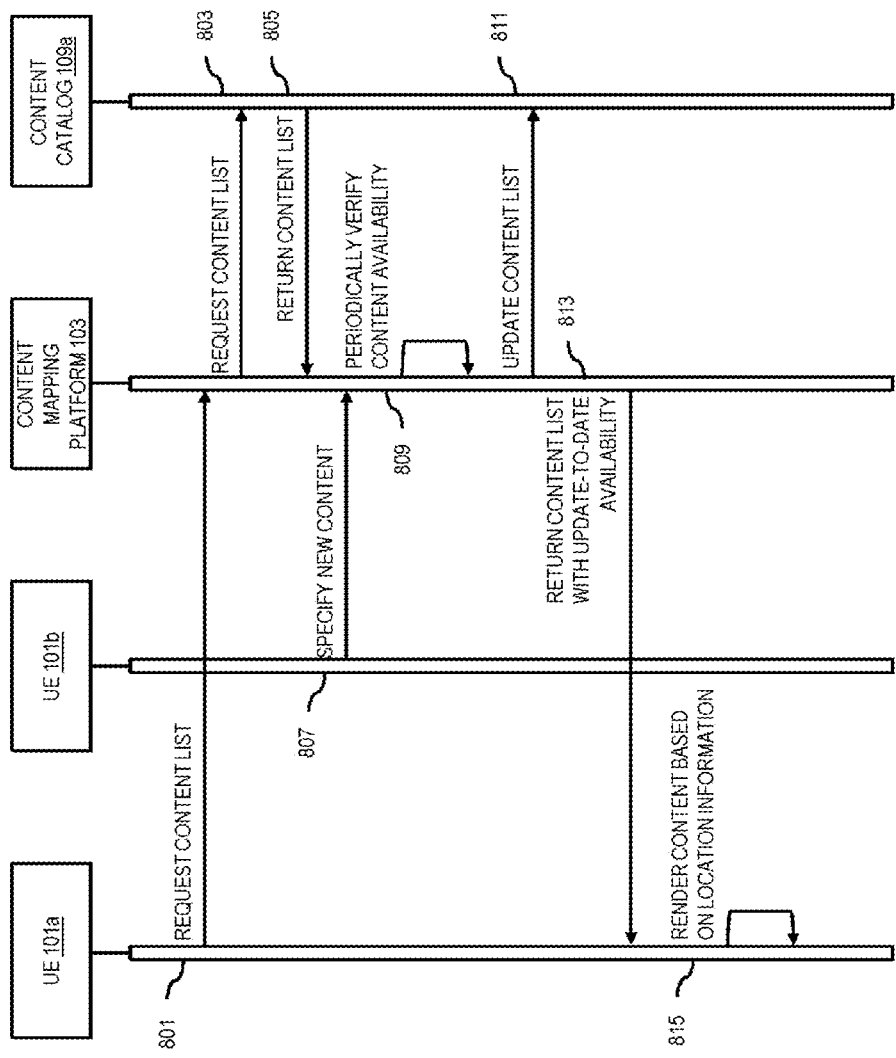
FIG. 8 is a time sequence diagram that illustrates a sequence of messages and processes for retrieving and updating content availability information, according to one embodiment.

FIG. 8 is a time sequence diagram that illustrates a sequence of messages and processes for retrieving and updating content availability information, according to one embodiment. A network process on the network is represented by a shaded vertical box. A message passed from one process to another is represented by horizontal arrows. A step performed by a process is indicated by the text. The network processes represented in FIG. 8 are a UE 101a, a UE 101b, a content mapping platform 103, and a content catalog 109a.

At 801, the UE 101a transmits a request to the content mapping platform 103 for a list of available content determined per the approach described herein. In one embodiment, the request may include filters which enable the UE 101a to select what kind of content should be included in the requested content list. For example, the request may seek information related to one more places marked as places that are of particular interest to a user of the UE 101a. The request may also define criteria for content of interest to the user. On receipt of the request, the content mapping platform 103 applies the filters and criteria to request a content list from the content catalog 109a (at 803). The content catalog 109a completes the request and returns the content list to the content mapping platform 103 (at 805).

In the meantime, the UE 101b accesses the content mapping platform 103 to specify new content to add to the content list (at 807). To specify the new content, the UE 101b may submit an access address (e.g., a URL) of the new content for evaluation by the content mapping platform 103. Either in response to the new content submission or as part of a periodic updating process (if so configured), the content mapping platform 103 verifies the new submission (at 809) and updates the content list for the content catalog 109*a* (at 811) based on the verification. At the same time, the content mapping platform 103 evaluates whether the new content passes the filter or satisfies the criteria applied by the UE 101*a* and transmits the updated content list to the UE 101*a* (at 813). The UE 101*a* is then assured of having an up-to-date content list specific to the applied filters and criteria. In some embodiments, the content mapping platform 103 may also apply external filters or criteria applied by content providers 115, the service platform 111, network operator, etc. For example, one external criteria may form a two-way link (essentially a tunnel through the Earth) between all or selected users and/or locations. This tunnel, for instance, restricts or filters content so that only a specific set of users (e.g., users located in a first location) can view content originating at a second location. For example, video content originating in New York may be restricted to viewing by only those users located in Tokyo. As described, this restriction, in essence, creates a "tunnel" from Tokyo to New York so that users in other locations will not have access to the restricted video content. Accordingly, the UE 101*a* renders a user interface presenting the content and location information specified in the received content list (at 815).

Figure 9:
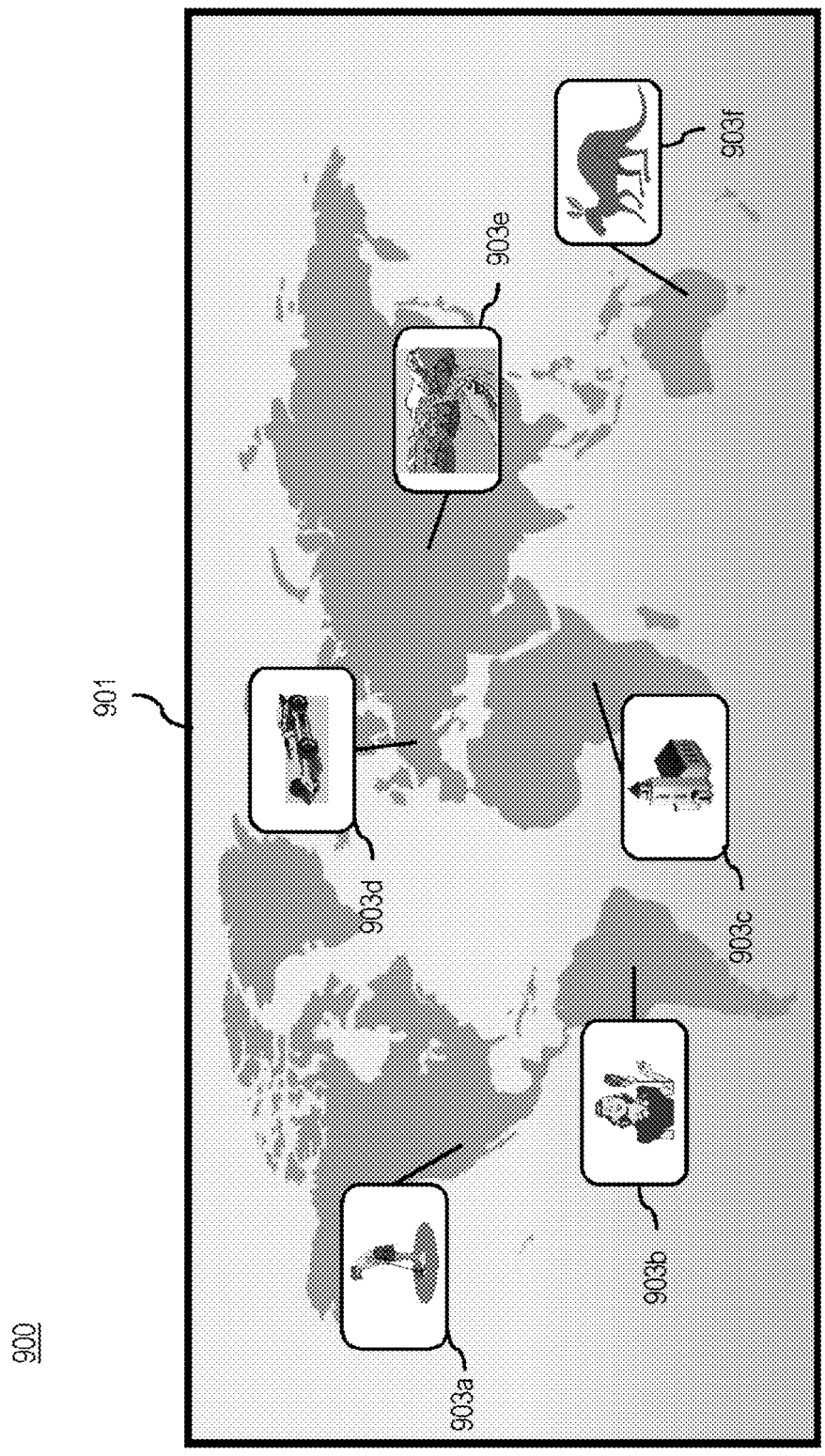
FIG. 9 is a diagram of a user interface utilized to present a global view of content on a map, according to one embodiment.

FIG. 9 is a diagram of a user interface utilized to present a global view of content on a map, according to one embodiment. The user interface 900 depicts a map view of content available over the communication network 105. As shown, the user interface 900 includes a map 901 that serves as a backdrop for placing graphical representations (e.g., thumbnails) of one or more content items 903*a*-903*f*. In this example, the content items 903*a*-903*f* have been verified by the content mapping platform 103 as being available for the time period used as the basis of the view. In certain embodiments, the user interface 900 may be animated to show the availability information of the content items 903*a*-903*f* over a defined period of time (e.g., a time lapse animation illustrating the availability information over a two hour period). In this way, the user can view an animation that illustrates content items 903*a*-903*f* appearing and disappearing as the broadcast schedules or content availability changes.

Moreover, although the map 901 is shown zoomed out to a global scale, it is contemplated that the map 901 may be zoomed in or out according to user preference and desired level of details. By way of example, the user interface 900 may show only select content items (e.g., most popular content items) when there are too many to display on the screen at one time without obscuring the map 901. As the user zooms into the map 901, additional content items may be shown based on, for instance, the zoom level and available display area. For example, as the user zooms in on North America, additional new content items can be display as other items are cut off from the display (e.g., items in Australia or Asia).

FIG. 10 is diagram of a user interface utilized to update content access information, according to one embodiment. As an alternate to the graphical map interface of FIG. 9, the user interface 1000 depicts a list view of global content wherein all available or potential content items are displayed in a table 1001. In this example, the content items have been filtered to show only those content items that are streaming television broadcasts available over the Internet. In one embodiment, the table 1001 lists the content items by television channel identifier 1003, description 1005, number of views 1007, date added 1009, and user rating information 1011. The user interface 1000 enables sorting and display by any of the available descriptive columns or fields.

The content list view enables the user to quickly view content items, for instance, when a user wants to add, delete, or modify one or more content items in the list. As shown, the user interface 1000 includes a command button 1013 for submitting a request to add new content item (e.g., a streaming broadcast channel). For example, if the user discovers an unlisted channel, the user can submit the channel to the content mapping platform 103 for verification and subsequent distribution to other users.

FIG. 11 is a diagram of a user interface utilized to present an augmented reality world view of content, according to one embodiment. The user interface 1100 depicts an augmented reality display of content using the transparency effect described above with respect to FIGS. 6 and 7. As shown, the user interface 1100 is displayed on a mobile device 1101 that includes sensors for determining viewpoint parameters such as location, direction heading, and angle of elevation. In this example, the mobile device 1101 is pointed towards the Earth in the direction of Africa. Because the viewpoint or perspective is a view through the Earth to the opposite surface (e.g., in essence from inside the Earth), Africa is shown as a mirror image.

As the mobile device 1101 pans around, the augmented reality user interface displays content items (e.g., content items 1103 and 1105) that are associated with the location in the user interface 1100 displayed based on the viewpoint of the mobile device 1101. The number of content items displayed is limited to prevent obscuring the map. In one embodiment, content items may be animated to appear and disappear periodically to display additional content. This animation also provides for a more dynamic and interesting display that may pique the user's interest in the content. Additionally, directional arrows (e.g., arrows 1107*a* and 1107*b*) may point in the direction that the mobile device 1101 can be moved to view additional or related content. These arrows 1107*a* and 1107*b* may also indicate the direction of content items that meet user search criteria.

The processes described herein for presenting a global view of content may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
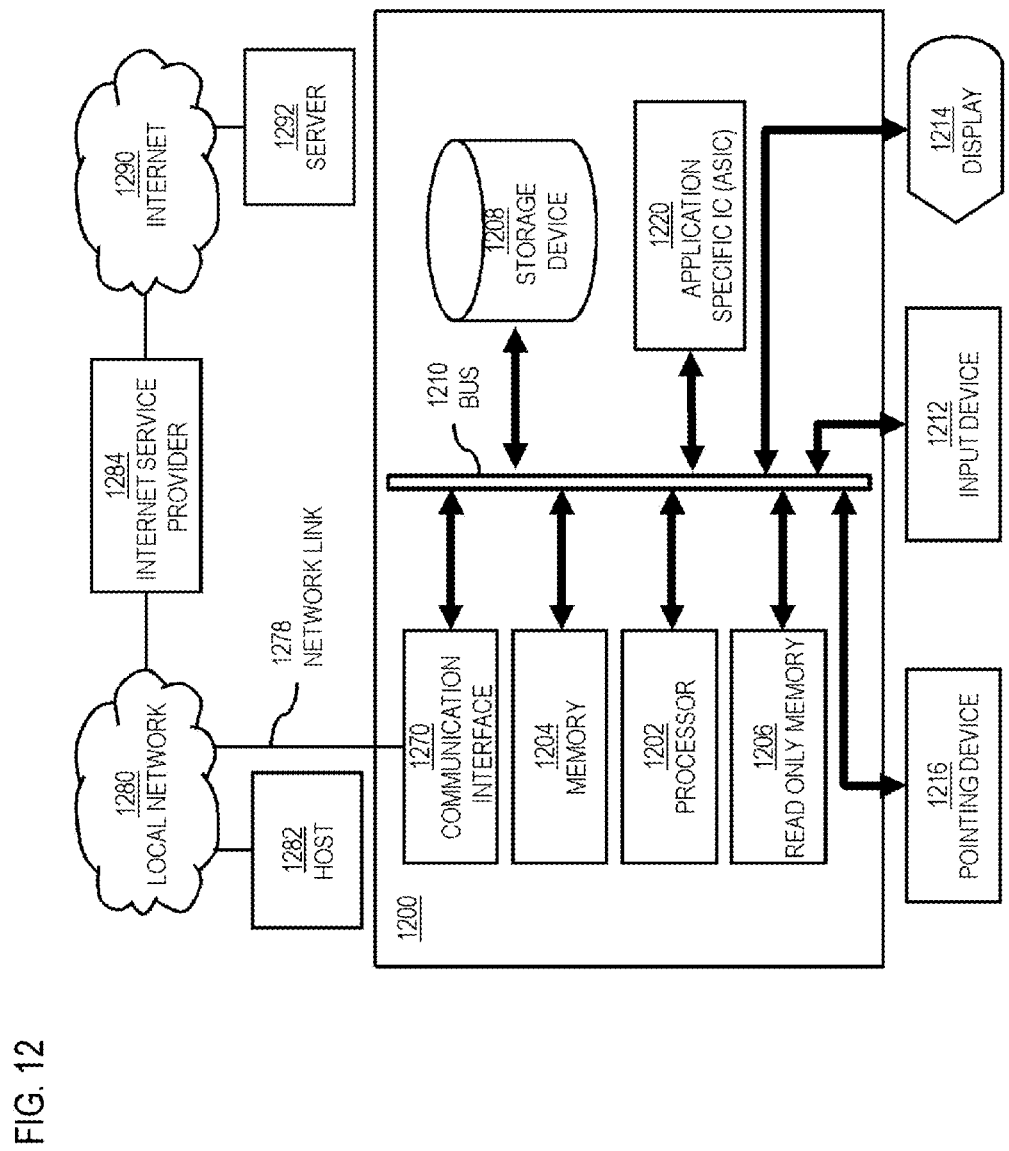
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to present a global view of content as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of presenting a global view of content.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to present a global view of content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for presenting a global view of content. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for presenting a global view of content, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for presenting a global view of content.

The term "computer-readable medium" as used herein to refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
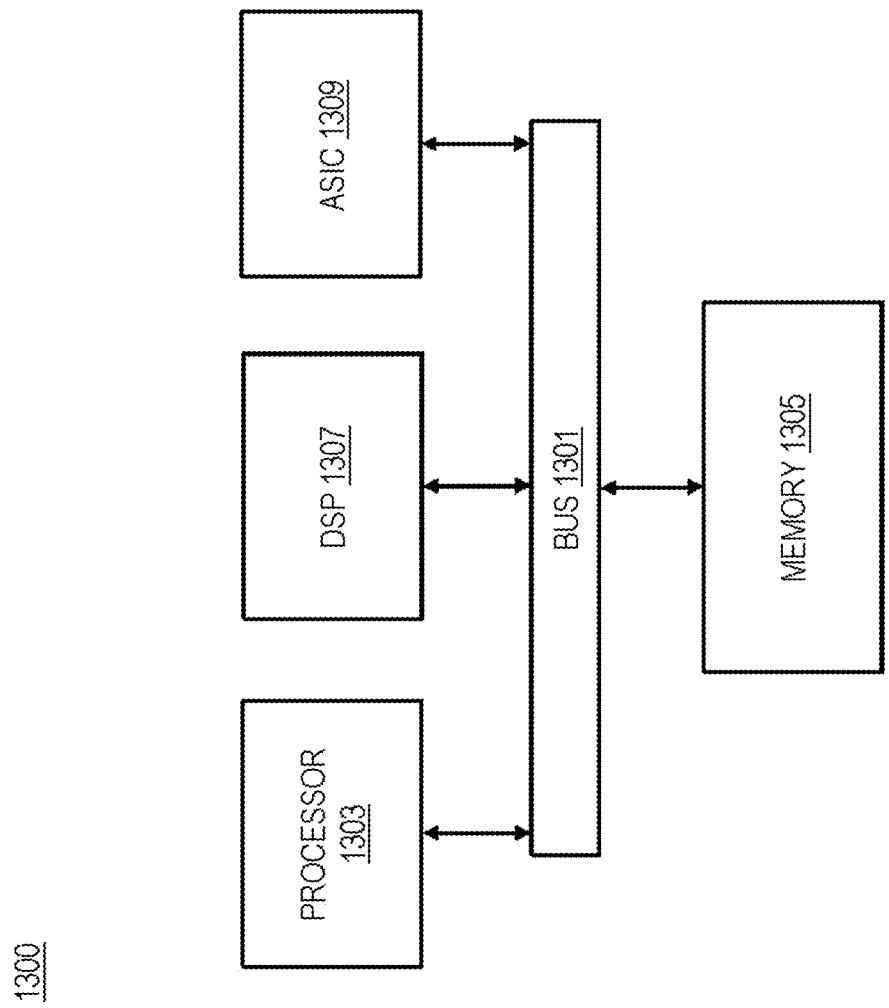
FIG. 13 is a diagram of a chip set that can be used to implement an embodiment of the invention.

FIG. 13 illustrates a chip set 1300 upon which an embodiment of the invention may be implemented. Chip set 1300 is programmed to present a global view of content as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of presenting a global view of content.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to present a global view of content. The memory 1305 also stores the data associated with or generated by the execution of the inventive steps.

Figure 14:
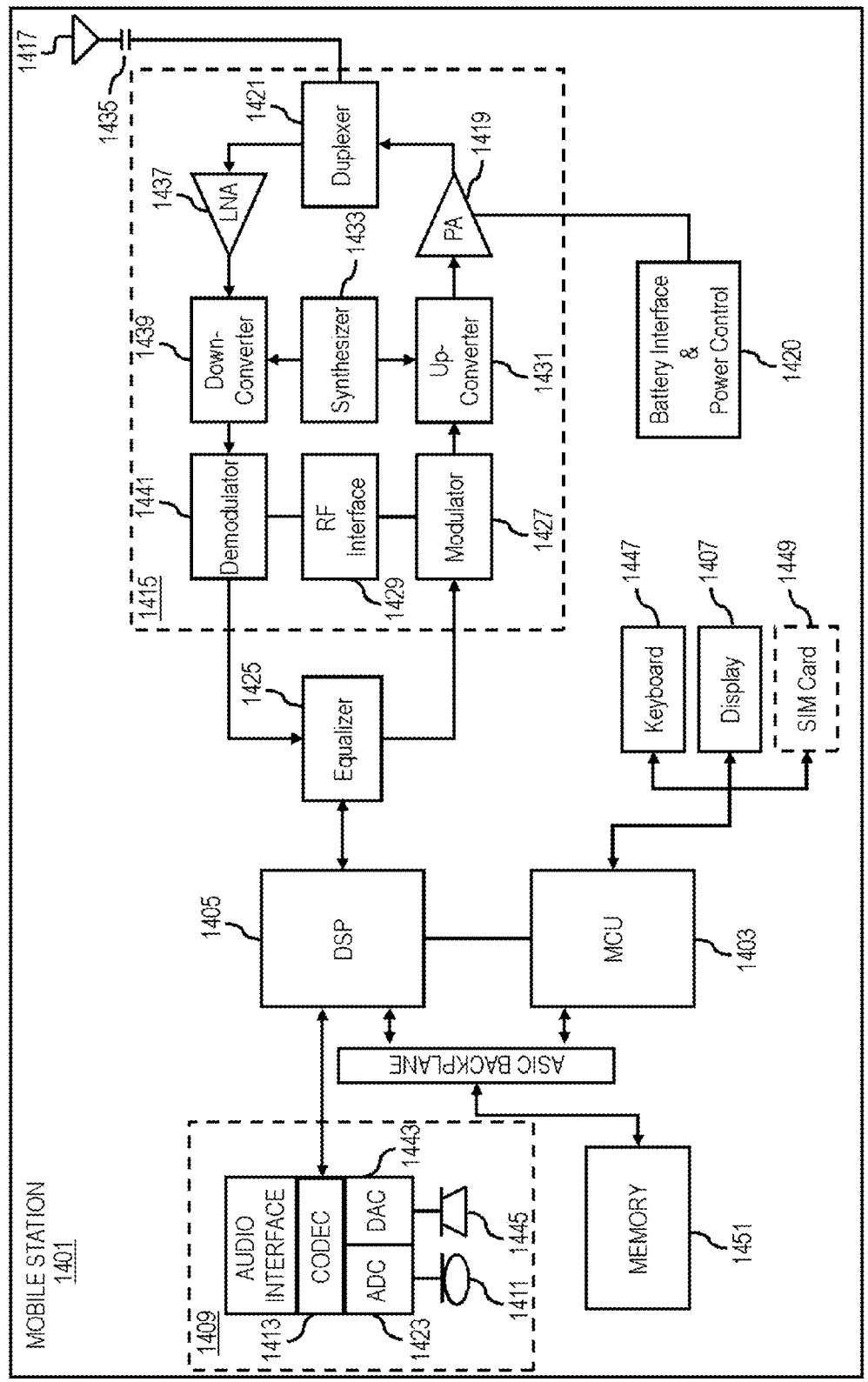
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of presenting a global view of content. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile device or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile device or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of presenting a global view of content. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile device or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to present a global view of content. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   a viewing location of a device with respect to a user interface, the viewing location determining location of the device being determined with respect to (i) an augmented virtuality to present a three-dimensional object model depicted in the user interface and (ii) at least one content item, wherein the user interface depicts the three-dimensional object model in which a surface of the three-dimensional object model closest to the viewing location is transparent to show, at least in part, an opposite surface of the three-dimensional object model;
   determining at least one target location associated with the at least one content item; and
   causing, at least in part, a rendering of the at least one content item on the opposite surface of the three-dimensional object model depicted in the user interface based, at least in part, on the at least one target location.

2. A method of claim 1, wherein the user interface is a map that includes a graphical representation of the at least one content item based, at least in part, on the viewing location, the at least one target location, or a combination thereof.

3. A method of claim 1, further comprising:
   receiving an input for specifying a time period in the past, present, or future,
   wherein the at least one content item is determined with respect to the time period.

4. A method of claim 1, further comprising:
   determining a directional heading, an angle of elevation, or a combination thereof associated with the device; and
   processing and/or facilitating a processing of the viewing location, the directional heading, the angle of elevation, or a combination thereof to determine the at least one target location, the at least one content item, or a combination thereof,
   wherein the viewing location, the directional heading, the angle of elevation, or a combination thereof of the device and the user interface are updated as the device moves.

5. A method of claim 2, further comprising:
   receiving one or more inputs for locking the viewing location, the at least one target location, the directional heading, the angle of elevation, or a combination thereof,
   wherein the user interface is rendered based, at least in part, on the locked viewing location, the locked at least one target location, the locked directional heading, the locked angle of elevation, or a combination thereof, and a movement of the device does not update the user interface.

6. A method of claim 1, further comprising:
   causing, at least in part, a rendering of at least one connection between the viewing location and the at least one target location,
   wherein the rendering of the least one connection is depicted as at least one tunnel.

7. A method of claim 1, further comprising:
   causing, at least in part, a sharing of the at least one target location, the viewing location, the at least one content item, or a combination thereof with one or more other devices.

8. A method of claim 1, further comprising:
   processing and/or facilitating a processing of the shared at least one target location, the viewing location, the at least one content item, or a combination thereof to determine frequency information, popularity information, or a combination thereof,
   wherein the rendering of the user interface, the at least one content item, the viewing location, the at least one target location, or a combination thereof is based, at least in part, on the frequency information, the popularity information, or a combination thereof.

9. A method of claim 1, further comprising:
   causing, at least in part, a coordination of a selection of the viewing location, one or more other viewing locations, the at least one target location, or a combination thereof among the device, one or more other devices, or a combination thereof based, at least in part, on the sharing,
   wherein the coordination supports, at least in part, one or more gaming applications.

10. A method of claim 1, wherein the at least one content item includes, at least in part, live media, stored media, metadata associated with media, text information, location information of other user devices, mapping data, geo-tagged data, or a combination thereof.

11. An apparatus comprising:
    at least one processor; and
    at least one non-transitory computer-readable storage medium including computer program code for one or more programs,
    the at least one non-transitory computer-readable storage medium and the computer program code configured to, with the at least one processor, cause the apparatus to perform at least the following,
    determine a viewing location of a device with respect to a user interface, the viewing location of the device being determined with respect to (i) an augmented virtuality to present a three-dimensional object model depicted in the user interface and (ii) at least one content item, wherein the user interface depicts the three-dimensional object model in which a surface of the three-dimensional object model closest to the viewing location is transparent to show, at least in part, an opposite surface of the three-dimensional object model;

determine at least one target location associated with the at least one content item; and cause, at least in part, a rendering of the at least one content item on the opposite surface of the three-dimensional object model depicted in the user interface based, at least in part, on the at least one target location.

12. An apparatus of claim 11, wherein the user interface is a map that includes a graphical representation of the at least one content item based, at least in part, on the viewing location, the at least one target location, or a combination thereof.

13. An apparatus of claim 11, wherein the apparatus is further caused to: receive an input for specifying a time period in the past, present, or future, wherein the at least one content item is determined with respect to the time period.

14. An apparatus of claim 11, wherein the apparatus is further caused to:

determine a directional heading, an angle of elevation, or a combination thereof associated with the device; and process and/or facilitate a processing of the viewing location, the directional heading, the angle of elevation, or a combination thereof to determine the at least one target location, the at least one content item, or a combination thereof, wherein the viewing location, the directional heading, the angle of elevation, or a combination thereof of the device and the user interface are updated as the device moves.

15. An apparatus of claim 12, wherein the apparatus is further caused to:

receive one or more inputs for locking the viewing location, the at least one target location, the directional heading, the angle of elevation, or a combination thereof, wherein the user interface is rendered based, at least in part, on the locked viewing location, the locked at least one target location, the locked directional heading, the locked angle of elevation, or a combination thereof, and a movement of the device does not update the user interface.

16. An apparatus of claim 11, wherein the apparatus is further caused to:

cause, at least in part, a rendering of at least one connection between the viewing location and the at least one target location, wherein the rendering of the least one connection is depicted as at least one tunnel.

17. An apparatus of claim 11, wherein the apparatus is further caused to:

cause, at least in part, a sharing of the at least one target location, the viewing location, the at least one content item, or a combination thereof with one or more other devices.

18. An apparatus of claim 11, wherein the apparatus is further caused to:

process and/or facilitate a processing of the shared at least one target location, the viewing location, the at least one content item, or a combination thereof to determine frequency information, popularity information, or a combination thereof, wherein the rendering of the user interface, the at least one content item, the viewing location, the at least one target location, or a combination thereof is based, at least in part, on the frequency information, the popularity information, or a combination thereof.

19. An apparatus of claim 11, wherein the apparatus is further caused to:

cause, at least in part, a coordination of a selection of the viewing location, one or more other viewing locations, the at least one target location, or a combination thereof among the device, one or more other devices, or a combination thereof based, at least in part, on the sharing, wherein the coordination supports, at least in part, one or more gaming applications.

20. An apparatus of claim 11, wherein the at least one content item includes, at least in part, live media, stored media, metadata associated with media, text information, location information of other user devices, mapping data, geo-tagged data, or a combination thereof.

* * * * *